US008465847B2

(12) United States Patent
Shaw et al.

(10) Patent No.: US 8,465,847 B2
(45) Date of Patent: Jun. 18, 2013

(54) MANUFACTURE OF SHAPE-MEMORY ALLOY CELLULAR MATERIALS AND STRUCTURES BY TRANSIENT-LIQUID REACTIVE JOINING

(75) Inventors: John A. Shaw, Ann Arbor, MI (US); David S. Grummon, East Lansing, MI (US)

(73) Assignees: The Regents of the University of Michigan, Ann Arbor, MI (US); Board of Trustees of Michigan State University, East Lansing, MI (US)

( * ) Notice: Subject to any disclaimer, the term of this patent is extended or adjusted under 35 U.S.C. 154(b) by 225 days.

(21) Appl. No.: 12/852,456

(22) Filed: Aug. 7, 2010

(65) Prior Publication Data
US 2011/0008643 A1    Jan. 13, 2011

Related U.S. Application Data

(62) Division of application No. 11/664,016, filed as application No. PCT/US2005/035348 on Sep. 30, 2005, now Pat. No. 7,896,222.

(60) Provisional application No. 60/615,033, filed on Oct. 1, 2004.

(51) Int. Cl.
*B32B 15/01*    (2006.01)
(52) U.S. Cl.
USPC ............ 428/616; 428/617; 428/662; 428/668
(58) Field of Classification Search
None
See application file for complete search history.

(56) References Cited

U.S. PATENT DOCUMENTS

| 3,662,455 | A | * | 5/1972 | Anderson | 228/124.6 |
| 3,675,311 | A | * | 7/1972 | Wells | 228/194 |
| 3,897,223 | A | | 7/1975 | Purdy et al. | |
| 4,034,906 | A | | 7/1977 | Carlson et al. | |
| 4,038,041 | A | | 7/1977 | Duvall et al. | |
| 4,770,725 | A | * | 9/1988 | Simpson et al. | 148/402 |

(Continued)

FOREIGN PATENT DOCUMENTS

| EP | 388685 A1 | 9/1990 |
| ES | 2021487 A6 | 11/1991 |
| JP | 04182023 A | 6/1992 |
| WO | WO 03018853 A2 * | 3/2003 |

OTHER PUBLICATIONS

Di et al., "Some Properties of Ni-Ti-Nb-X Quarternary Alloys," *Z. Metallkd.* 91:258-260 (2000).

(Continued)

*Primary Examiner* — Jennifer McNeil
*Assistant Examiner* — Adam Krupicka
(74) *Attorney, Agent, or Firm* — Marshall, Gerstein & Borun LLP

(57) ABSTRACT

This invention discloses a method, using pure niobium as a transient liquid reactive braze material, for fabrication of cellular or honeycomb structures, wire space-frames or other sparse builtup structures or discrete articles using Nitinol (near-equiatomic titanium-nickel alloy) and related shape-memory and superelastic alloys. Nitinol shape memory alloys (SMAs), acquired in a form such as corrugated sheet, discrete tubes or wires, may be joined together using the newly discovered joining technique. Pure niobium when brought into contact with nitinol at elevated temperature, liquefies at temperatures below the melting point and flows readily into capillary spaces between the elements to be joined, thus forming a strong joint.

26 Claims, 19 Drawing Sheets

U.S. PATENT DOCUMENTS

| | | | |
|---|---|---|---|
| 4,883,640 A * | 11/1989 | Mizuhara | 420/417 |
| 4,973,366 A | 11/1990 | Yasuda et al. | |
| 5,242,759 A | 9/1993 | Hall | |
| 5,540,712 A | 7/1996 | Kleshinski et al. | |
| 6,071,308 A | 6/2000 | Ballou et al. | |
| 6,106,642 A | 8/2000 | DiCarlo et al. | |
| 6,485,507 B1 | 11/2002 | Walak et al. | |
| 7,288,111 B1 | 10/2007 | Holloway et al. | |
| 7,300,708 B2 | 11/2007 | Gigliotti, Jr. et al. | |
| 7,442,200 B2 | 10/2008 | Mazzocchi et al. | |
| 7,491,229 B2 | 2/2009 | Eder et al. | |
| 2004/0197519 A1* | 10/2004 | Elzey et al. | 428/68 |
| 2005/0158573 A1* | 7/2005 | Elzey et al. | 428/593 |
| 2005/0283190 A1 | 12/2005 | Huitema et al. | |

OTHER PUBLICATIONS

Melton et al., "Wide Hysteresis Shape Memory Alloys Based on the Ni-Ti-Nb System," *Proceedings of the MRS International Meeting on Advanced Materials*, 9:165-170 (1989).

Prima et al., "Investigation Methods and Properties of Powdered Materials," *Powder Metallurgy and Metal Ceramics*, 34(3-4):155-160 (1995).

Siegert et al., "Influence of Nb Content and Processing Conditions on Microstructure and Functional Properties of NiTiNb Shape-Memory Alloys," *Materials Science Forum*, 394-395:361-364 (2002).

Yufeng et al., "Effects of Heat Treatment on Tensile Properties and Shape Memory Effects of Ni-Ti-Nb Alloy," *Trans. Nonferrous Met. Soc. China*, 7(4):92-96 (Dec. 1997).

Zhang et al., "Effects of Deformation on the Transformation Hysteresis and Shape Memory Effect in a $Ni_{47}Ti_{44}Nb_9$ Alloy," *Scripta Metallurgica et Materialia*, 24:1807-1812 (1990).

Zhao et al., "Deformation-Induced Martensitic Transformation and Its Reversibility in Ni-Ti-Nb Wide Hysteresis Shape Memory Alloys," *Acta Metallurgica Sinica*, 33(1):90-98 (Jan. 1997).

Zhao et al., "Transformation and Mechanical Behavior of a $Ni_{47}Ti_{44}Nb_9$ Shape Memory Alloy," *Proceedings of the MRS International Meeting on Advanced Materials.*, 9:171-176 (1989).

de Salazar et al., "Transient Liquie Phase (TLP) Diffusion Bonding of a Copper Shape Memory Alloy Using Silver as Interlayer," *Scripta Materialia*, 37(6):861-867 (1997).

International Search Report for PCT/US05/35348.

MacDonanld et al., "Transient Liquid Phase Bonding," *Annu. Rev. Mater. Sci.*, 22:23-46 (1992).

* cited by examiner

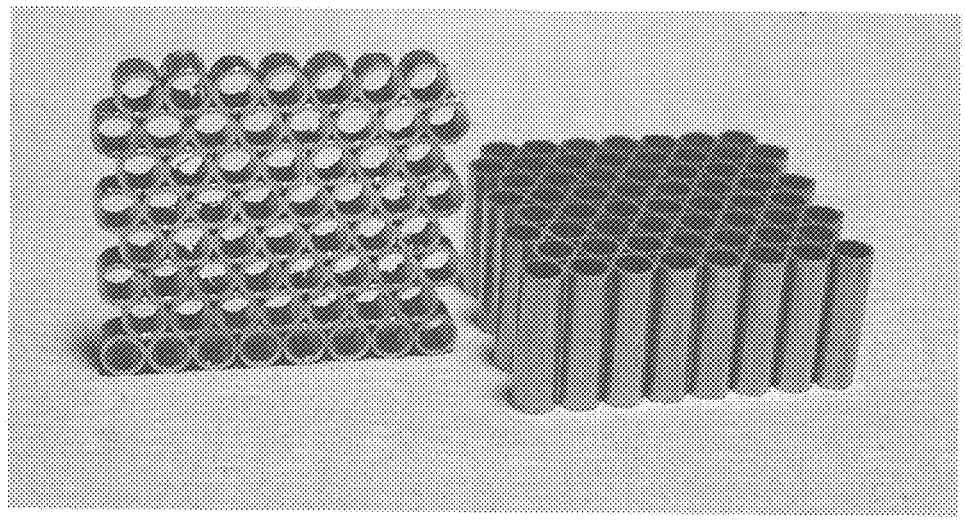
Figure 14
Figure 15A
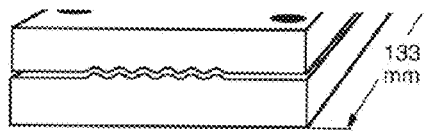
Figure 15B
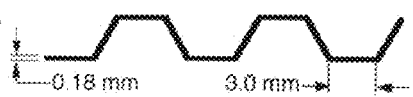
Figure 15C
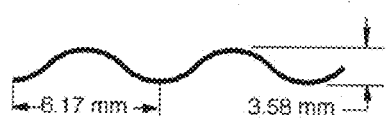
Figure 16A
Figure 16B
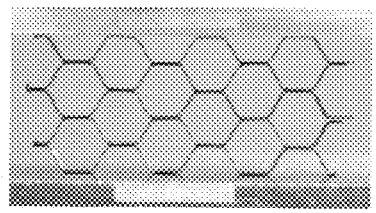
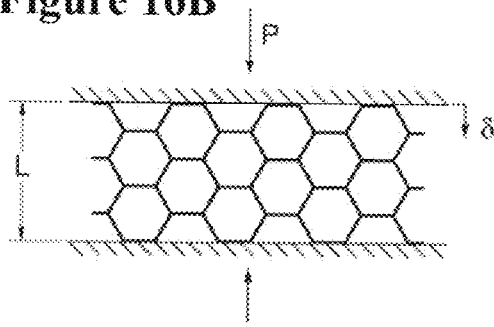

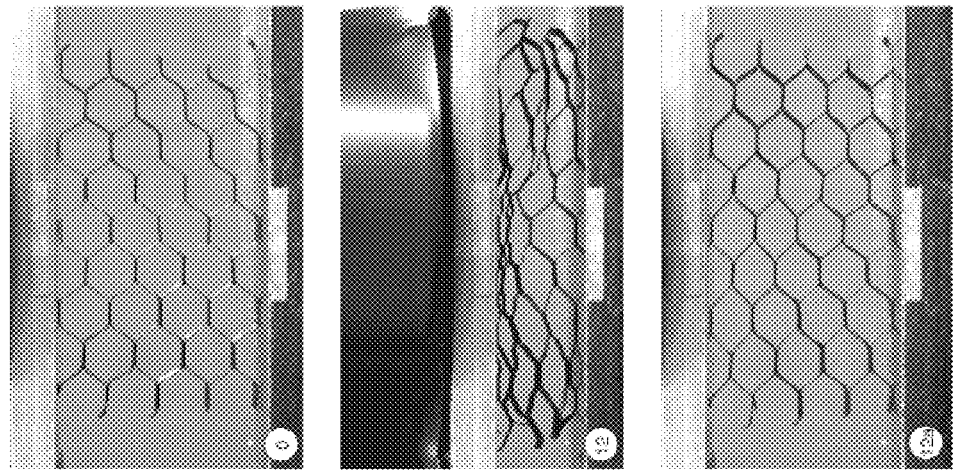
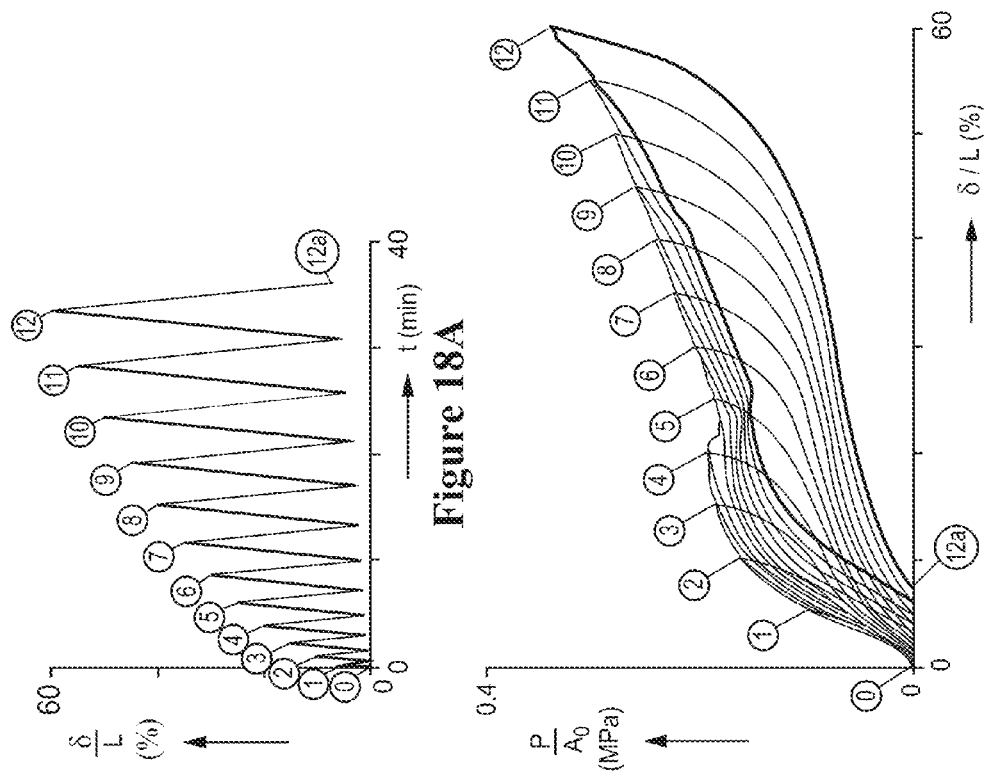
Figure 18A
Figure 18B
Figure 18C

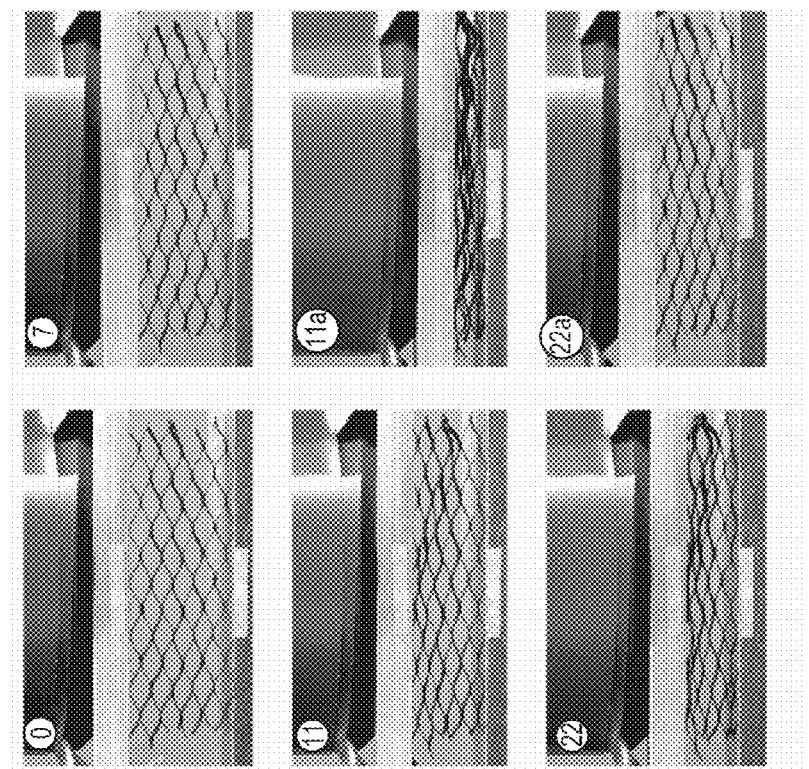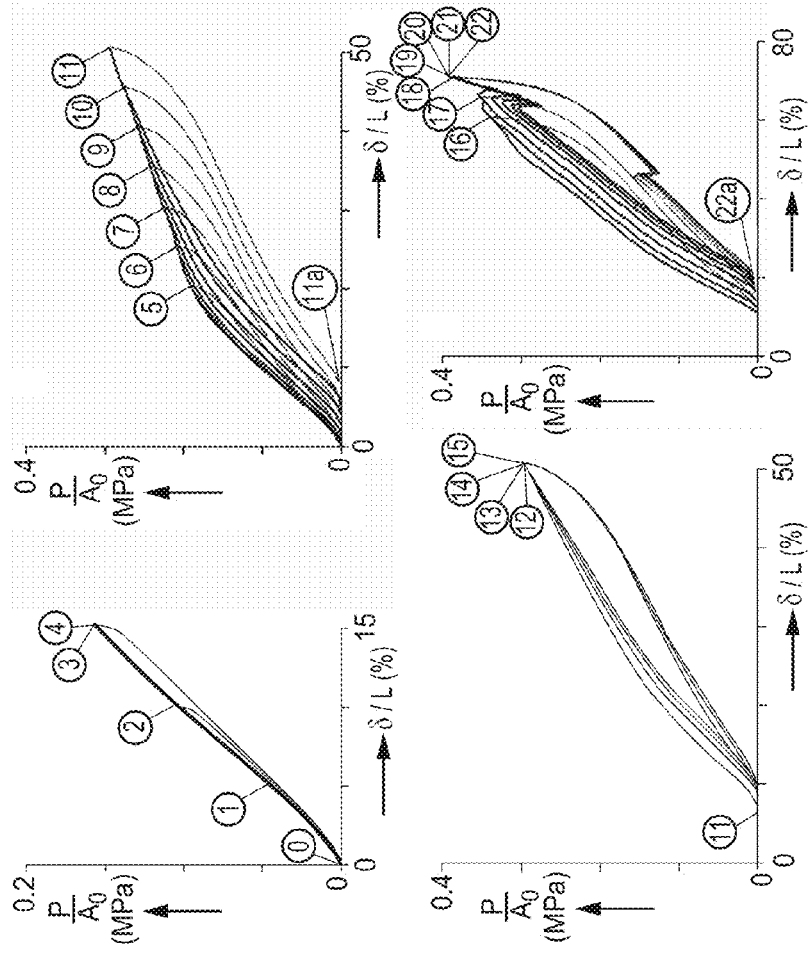
Figure 19A
Figure 19B
Figure 19C
Figure 19D
Figure 19E

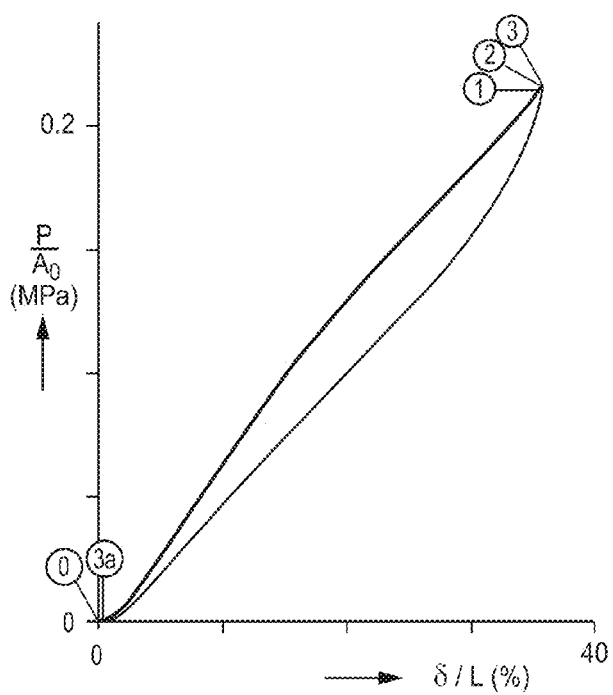 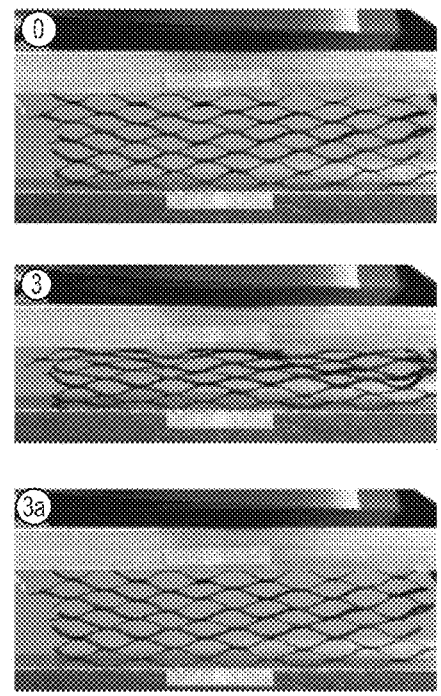
Figure 20A                Figure 20B
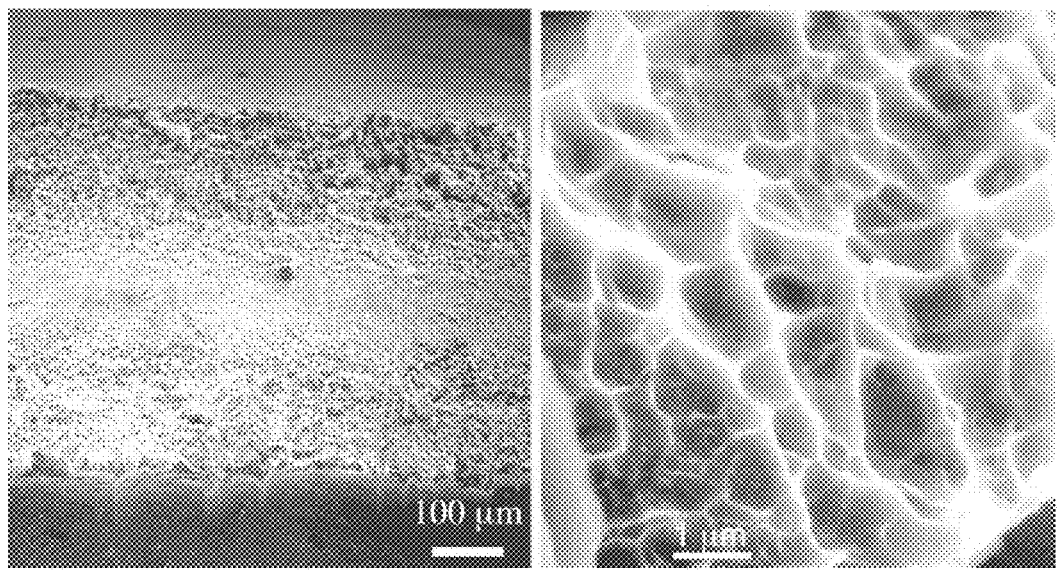
Figure 21

MANUFACTURE OF SHAPE-MEMORY ALLOY CELLULAR MATERIALS AND STRUCTURES BY TRANSIENT-LIQUID REACTIVE JOINING

CROSS-REFERENCE TO RELATED APPLICATION

This application is a divisional application of U.S. patent application Ser. No. 11/664,016 filed May 19, 2008 now U.S. Pat. No. 7,896,222, that claims the benefit of priority of International Patent Application No. PCT/US05/035348 filed on Sep. 30, 2005, which claims priority of U.S. Patent Application No. 60/615,033 filed Oct. 1, 2004. The entire text of the priority applications are incorporated herein by reference in their entirety.

CONTRACT INFORMATION

This invention was made with U.S. Government support under Research Grant No. N00014-01-1-0581, awarded by the U.S. Navy. Accordingly, the U.S. government may have certain rights in this invention.

FIELD OF THE INVENTION

The present invention relates to a transient-liquid reactive brazing method that allows the fabrication of low density metal alloy structures, such as cellular or honeycomb structures, wire/tube space-frames, or other sparse built-up structures using nitinol (near-equiatomic titanium-nickel alloy) or related shape-memory and superelastic alloys, or high temperature SMAs, such as NiTi X alloys, wherein X is Hf or Zr substituted for Ti and/or X is Cu, Pd, Pt and/or Au substituted for Ni, e.g., NiTiCu or TiNiPd. More particularly, shape memory alloys (SMAs), in forms such as corrugated sheets, discrete tubes, wires, or other SMA shapes are joined together using a transient-liquid reactive metal joining technique, wherein a brazing metal contacts an SMA, like nitinol, at an elevated temperature. The brazing metal, preferably niobium, liquefies at a temperature below the melting point of both the brazing metal and the SMA, and readily flows into capillary spaces between the elements to be joined, thus forming a strong joint. Surprisingly, no flux is required and the joined structures are biocompatible.

BACKGROUND OF THE INVENTION

Materials that combine ultra-low density with the desirable characteristics of metals have been an object of technical development for decades, and a variety of metals and alloys are commercially available in various cellular forms. Cellular structures made from shape-memory alloys (SMAs) are particularly intriguing for their potential to deliver shape memory and/or superelasticity in a lightweight material. While porous forms of NiTi have been made [Lagoudas et al., 2001], the difficulty of joining Nitinol to itself has prevented the realization of built-up cellular honeycombs from NiTi-based SMAs Even when conventional strength and stability characteristics are all that is sought, metallic foams and honeycombs, with their light-weight, high specific stiffness, and well-developed energy absorption characteristics, are of obvious utility [Gibson and Ashby, 1997; Ashby, et. al., 2000]. In particular, Papka and Kyriakides [1994, 1998] presented interesting in-plane crushing experiments of hexagonal aluminum honeycombs. These showed an initial stiff response, followed by a plateau where crushing continued at nearly constant load. The plateau was associated with localized deformation of particular rows of cells. Shear-like bands propagated as the honeycomb densified, and the plateau ended as mutual contact of the cell walls caused the load to rise steeply. Of course, the aluminum honeycombs in these experiments suffered permanent deformation.

Some attempts to produce porous SMAs by hot isostatic pressing of powders [Lagoudas, et al., 2001, Thangaraj, et al., 2000, Li, et al., 2000] have achieved relative densities as low as 30%, but the irregular pore shape in these materials causes stress concentrations that severely degrade mechanical properties. More recently, a Nitinol-based material with a more regular, open-cell foam topology, and a relative density below 5%, was reported [Shaw, et al., 2002; Grummon, et al., 2003]. These materials were realized using a powder metallurgy technique and a polymeric foam precursor, and were shown to possess the martensitic transformation characteristics of SMAs. Unfortunately, embrittlement by interstitial contaminants prevented a useable superelastic response.

Honeycomb structures built up from wrought SMAs are a viable alternative to foamed or porous metals if a method can be found to join individual corrugated or dimpled sheets or strips. The necessary joining step to create an open topology must not only provide a robust metallurgical bond, but must also be derivable from a simple, clean, and cost-effective batch process. Given the range of potential applications, the bond should additionally have high corrosion resistance, good thermal stability, and should contain only biocompatible phases. While a few specialized techniques for soldering and welding Nitinol have been developed over the years, until now no low-cost joining method capable of producing tough metallurgical bonds in complex multiple-contact structures, such as honeycombs or spaceframes, has been available.

Recent manufacturing advances enabled the creation of metallic honeycombs and meshes, which are of increasing technological and economic importance. As used herein, a honeycomb or a mesh is a material having an extreme degree of free space, i.e., less than 10% dense, preferably less than 5% dense, compared to a simple porous material that typically is 40% to 90% dense.

Metallic shapes can be manufactured either as two-dimensional honeycombs or as three-dimensional open- or closed-cell configurations, depending on the manufacturing process. Open-cell configurations are a network of thin ligaments joined at nodes that act as beam/torsion elements. Closed-cell configurations, by contrast, are composed of intersecting polyhedra with the material forming thin shell elements. Both types of forms possess the properties of light weight and high specific stiffness, making the foams suitable for a variety of structural applications, such as sandwich cores.

Manufacturing techniques currently are being developed that can produce complex geometries, and in the case of sandwich cores, include integral face plates. In overload conditions, the geometries can provide efficient energy absorption through the mechanisms of crushing and densification. These honeycomb and mesh structures initially are stiff in compression, but once a critical load is reached, they crush by buckling and collapse of the thin ligaments at a relatively constant load. In addition, providing cooling flow of gaseous or liquid materials through an open-cell configuration provides an effective means of heat transfer, thereby making the metallic structure multifunctional.

A variety of manufacturing approaches have been used to produce honeycomb and mesh metallic configurations from conventional alloys, including inert gas blowing, mechanical stirring, and the introduction of outgassing agents into the molten metal before freezing. Aluminum is particularly suited for use in these processes because of its low density and low melting point. Investment casting has also been used to manufacture metallic honeycombs and meshes. In this process, the molten metal is poured into the interstices of a particulate material, like a water-soluble salt, which then is flushed away after the metal freezes.

One objective of the above-identified methods of manufacturing metallic structures, such as honeycombs and meshes is to provide a class of materials that combines the properties of a shape memory alloy (SMA) with extremely sparse topology. SMAs, such as NiTi (or nitinol), exhibit two remarkable strain recovery properties in wrought form, i.e., the shape memory effect and superelasticity. The first property refers to an ability of an SMA to recover from large mechanically induced strains (i.e., up to 8%, e.g., in extant SMA structures) by moderate increases in temperature. The latter properties refers to the rubber-like, hysteretic strain recovery in relatively high temperature regimes. In each case, the underlying mechanism is a reversible martensitic transformation between solid-state phases that can be induced by changes in temperature or stress. An important SMA is near equiatomic NiTi, which also has excellent structural properties, corrosion resistance, and long-term biocompatibility, making NiTi an attractive choice for many structural applications.

Shaw et al., in "Proceedings of 2002 ASME International Mechanical Engineering Congress and Exposition," Nov. 17-22, 2002, New Orleans, La., pages 1-10, incorporated herein by reference, discloses the production of a light (5% dense) NiTi structure having a more regular open-cell structure, which provides an improved specific stiffness and improved strain recoverability. The Shaw et al. publication also provides a review of recent experimental work on monolithic NiTi.

SMA honeycomb and mesh materials, therefore, have the potential to act as adaptive structural elements that respond to changes in external loads and the thermal environment. Also, the superelastic properties of SMAs can be used to create lightweight, reusable energy-absorbing materials, or highly damage-tolerant, self-repairing materials. A variety of applications are envisioned for such SMA honeycomb and mesh materials, like impact-tolerant armor, vibration-isolation elements, adaptive skins, and control surface elements, for example. The biocompatibility and extreme porosity of a NiTi honeycomb or mesh also lends itself to use in biomedical devices and implants.

Although prior investigators prepared metallic foams, such as nitinol foams, no method currently is available to effectively join individual nitinol shapes, such as tubes and wires, to provide a structure containing joined nitinol, or other SMA, elements that is sufficiently strong for practical applications. The present invention is directed to a method of joining individual metallic SMA elements, such as honeycomb and mesh elements into built-up structures for effective use in practical applications.

SUMMARY OF THE INVENTION

SMA cellular materials are a new class of materials that until recently have been exceedingly difficult to fabricate. The low density structures and methods of manufacturing the low density, sparse built-up structure described herein permit the desing and fabrication of materials and structures that combine the advantages of metallic foam with the adaptive properties of an SMA. Besides the individual advantages of these two classes of materials, the combination should provide adaptive properties beyond those of a conventional monolithic SMA. The free space inherent in the cellular architectures described herein will result in deformation kinematics that amplify thermoelastic shape-recovery to well-beyond the conventional monolithic strain limits, while simultaneously improving the thermal time constant by increasing the surface to volume ratio. Both attributes—isothermal recovery (superelasticity) and thermal shape recovery—are of obvious interest in the context of active structures. Nitinol honeycombs, as described herein, can be manufactured as open-cell, layered structures by simply building them up from wrought SMA sheet, strip, tube, or wire (pre-engineered and acquired off-the-shelf), making the structures economically attractive. The shape-memory and superelastic metal cellular structures described herein combine high specific stiffness, high resilience and excellent fatigue-resistance, with low density, good thermal and chemical stability and biocompatibility.

The maximum tensile strain recovery obtainable from a monolithic Nitinol polycrystal is in the range of 5 to 8%, in the low-cycle limit, and is less than 2.5% when high cycle fatigue is a factor. These limits can, however, be substantially exceeded by exploiting bending of thin ligaments during in-plane loading of open-cell structures. Open structures also cope more effectively with latent heat effects associated with the underlying displacive transformations in SMAs. Thermal inertia tends to dominate the response time of SMA actuators, and furthermore, can cause hypersensitive rate dependencies [Shaw and Kyriakides 1995, 1997; Shaw, et al., 2003, Iadicola and Shaw 2004]. The volume-to-surface area ratio is greatly reduced with cellular materials. This also allows the material to be quenched during fabrication to develop optimal properties, which is not possible for large monolithic Nitinol sections. Described herein are Nitinol structures with enhanced effective properties, i.e., an order-of-magnitude improvement in strain recovery and thermal response time. Preliminary mechanical experiments have successfully demonstrated an amplified form of superelastic response (with over 50% strain recovery) for the first time. It should be noted that "cellular SMAs" are distinct from the so-called "porous SMAs", typically made from powder metallurgy processes, which have near 50% relative density, relatively poor material properties, and irregular microstructures. By contrast, the cellular SMAs described herein preferably have a relative density of less than 10%, more preferably less than 5% with highly controlled and regular internal lattice structures by joining commercially available wrought SMA materials.

Currently no viable technique exists that is capable of manufacturing cojoined metallic foam elements, such an article prepared from individual nitinol shapes. The built-up structures of the present invention function as low-density articles that display shape-memory and/or transformational superelasticity, thereby combining (a) the advantages of low density, high specific strength, high specific energy absorption capabilities of sparse cellular structures, and (b) the active and passive properties of SMAs.

The articles of cojoined SMA elements described herein provide a new class of lightweight, active materials. The structures described herein are not formed from powders and are different from the so-called "porous SMAs" (usually prepared by hot-isostatic pressing of powders) that have a relative density typically in the 40% to 60% dense range, uncontrolled and rather irregularly shaped pores, and generally poor to fair memory and superelastic properties.

By contrast, in the present invention, the preferred cellular articles described herein have a much lower density (i.e., less than 5% dense can be joined), resulting in an article that can be provided with regular cell structures, retains excellent shape memory and superelastic properties of the individual SMA shapes and can be made with much lower density. Such articles have broad applications as thermally active multi-functional materials, energy resilient structures, vibration damping structures, and biocompatible implants, thereby making them suitable for applications in commercial and military sectors of the aerospace, automotive, and biomedical fields.

BRIEF DESCRIPTION OF THE DRAWINGS

FIG. 2b is a possible alternate form of the NiTi—Nb vertical section (isopleth) if, as indicated in [Prima, et al., 1995] the isopleth intersects the L+bccNb, Ti<- ->NiTi+ NiNb 4-phase reaction plane at 1140° C.;

FIG. 14 is a photograph of a sixty-cell hexagonal SMA honeycomb structure bonded according to the method described herein;

FIG. 15a shows an example of a small shape setting die (bi-cylindrical corrugation) accommodating about twenty 75 mm long strips; FIGS. 15b and 15c show the dimensions of the hexagonal- and bi-cylindrical corrugation of FIG. 15a;

FIG. 16 shows an experimental arrangement: Examples wherein FIG. 16a is an initial specimen image and FIG. 16b is a schematic of the honeycomb compression experiments;

FIG. 17 shows compression results from Example 1.

FIG. 18 shows results of Experiment 2: (a) compressive strain history, (b) mechanical response to incremental strain cycles, (c) selected specimen images;

FIG. 19 shows results of Experiment 3: a-d: Mechanical response of wavy-corrugated specimen: (a) three incremental cycles and then one repeated cycle to 15% compressive strain, (b) subsequent incremental cycles 5 through 11, (c) cycles 12 through 15 repeated to 50% strain, showing shakedown behavior and slight, but slowing, strain ratcheting, (d) incremental cycles 16 through 18 and then repeated cycles 19 to 22 to 70% compressive strain. Residual strain is near 20%. (Note changes in scales between plots); e: Selected images of specimen;

Figure 17C:
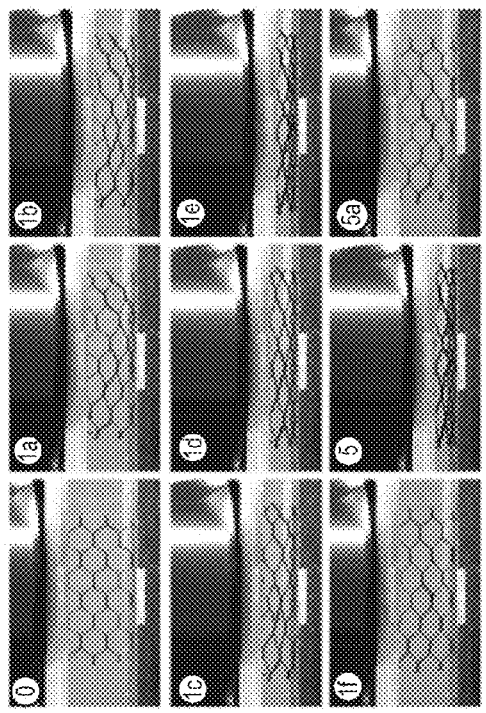
FIG. 17c shows selected hexagonal honeycomb specimen images. The 'numbers' referred to in FIG. 17 are those in circles and correlate the load-time history of FIG. 17a with the stress-strain history shown in FIG. 17b and the photos in of FIG. 17c.
Figure 17D:
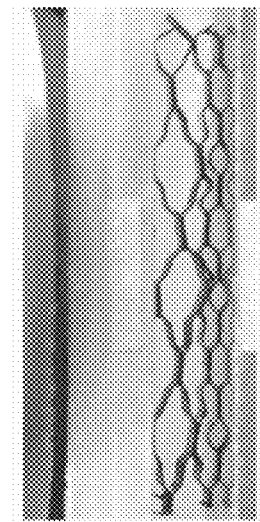
FIG. 17d is a magnified view of the specimen for the circled number 5.
Figure 17A:
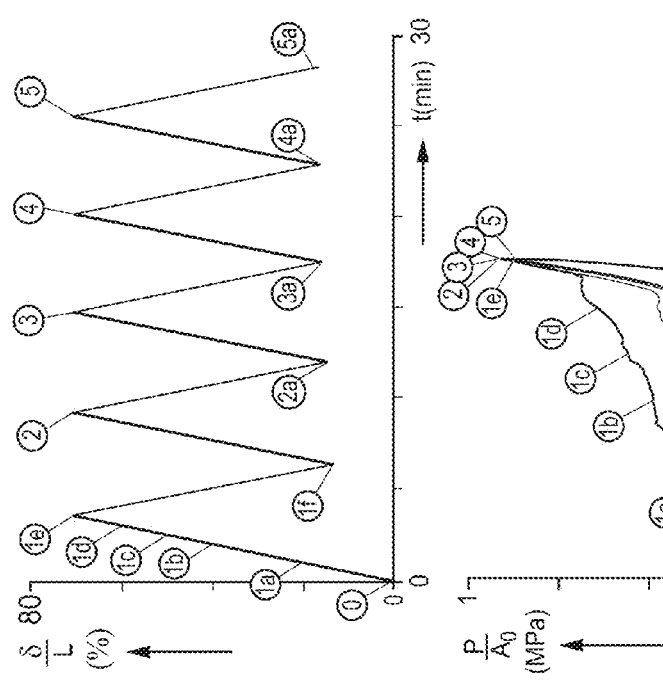
FIG. 17a shows the prescribed compressive strain history.
Figure 17B:
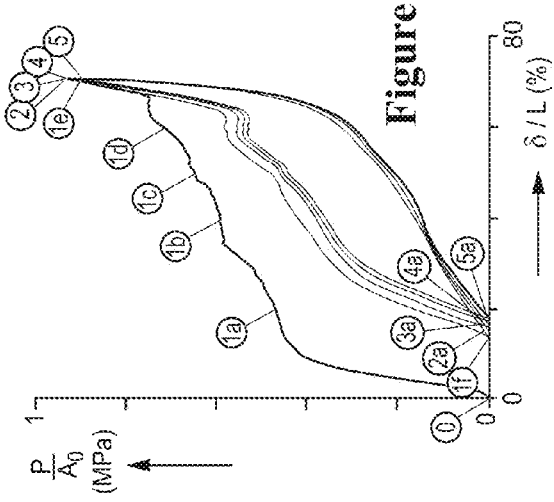
FIG. 17b shows the compressive mechanical response, showing shakedown of enhanced superelastic behavior with over 50% strain recovery.

FIG. 20a shows the subsequent compressive response of the specimen of Example 3 after renormalizing the strain by the new gage length. Three cycles show excellent repeatability; FIG. 20b shows selected images of the specimen corresponding to numbers in FIG. 17a.

Figure 22:
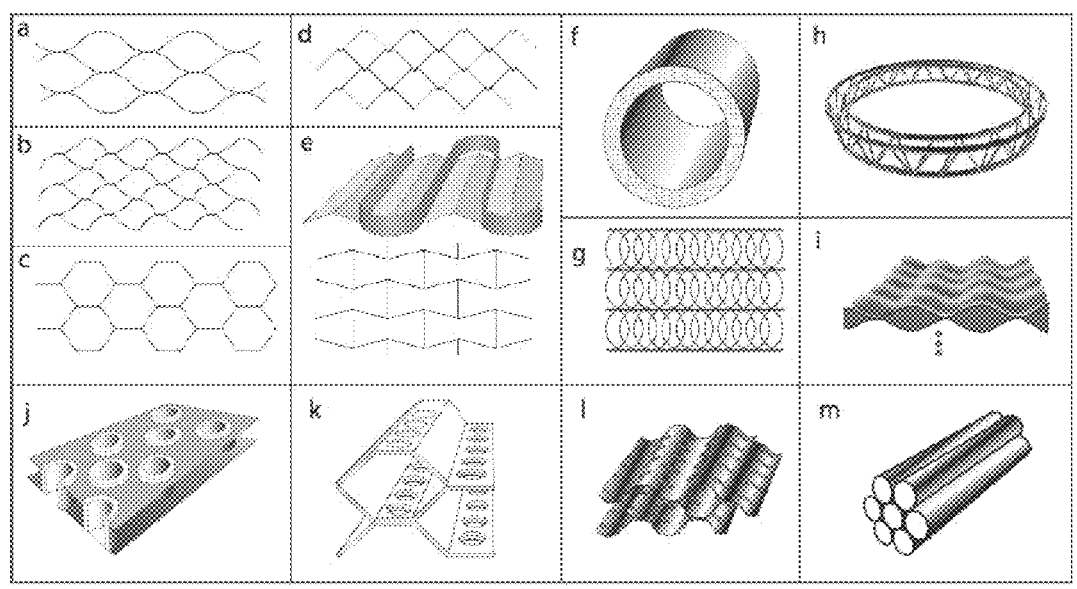
Figure 23:
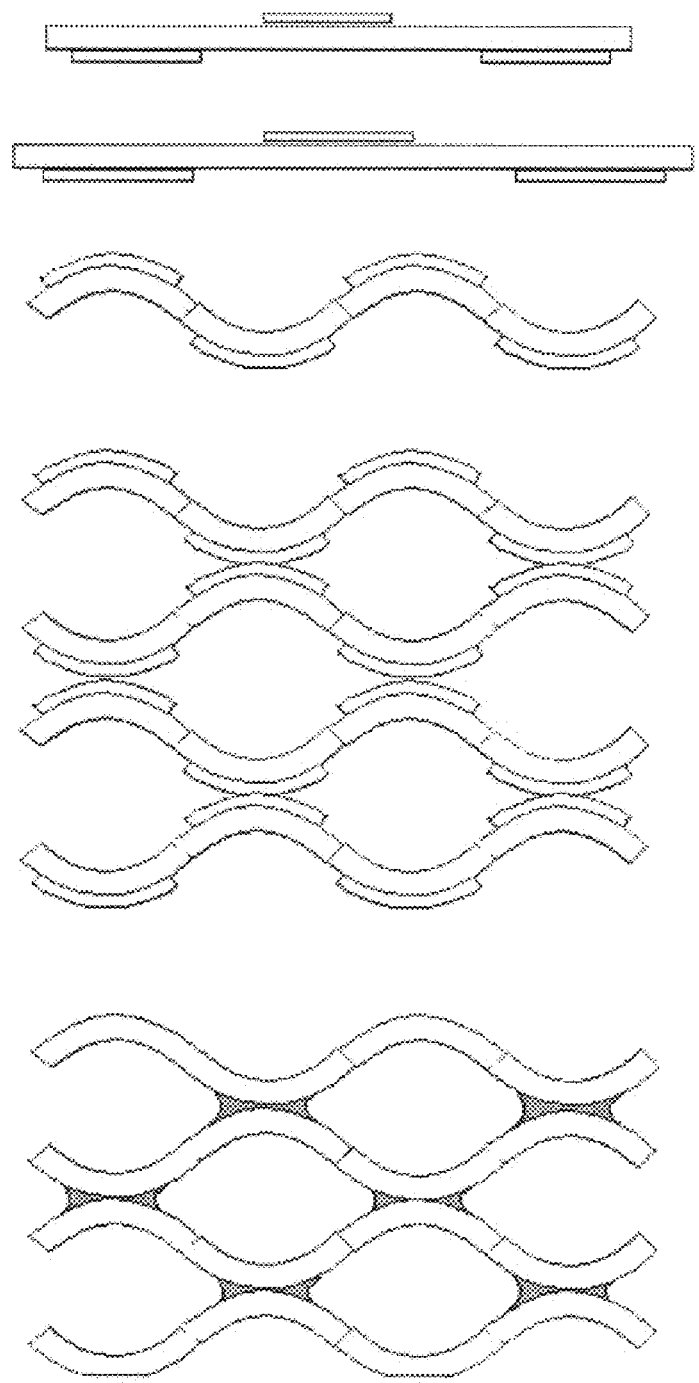

FIG. 21 on the left-hand side shows a fracture surface through the brazed joint made manually at room temperature showing a fracture path through the braze metal and no tendency for the braze to tear away from the NiTi tube surfaces. The right-hand side shows detail from the fracture surface shown in FIG. 19. The dimpled morphology indicates the ductile nature of the braze alloy fracture;

FIG. 22 are topological forms enabled by the new joining method. Note that form (e) is auxetic; and FIG. 23 shows another embodiment for adhering together a plurality of shape memory alloy elements by sputtering a reactive brazing metal at bond locations on at least one of the shape memory alloy elements, followed by disposing the shape memory alloy elements in contact, at the reactive brazing metal, and heating to form alloy liquid bonds.

DETAILED DESCRIPTION OF THE PREFERRED EMBODIMENTS

The following description is primarily directed to NiTi and pure niobium as the brazing metal. However, this emphasis is merely for descriptive purposes, and the present transient-liquid reactive joining method extends to other SMAs and brazing metals known to persons skilled in the art, as well as to pure niobium alloyed with any metal capable of forming an alloy with niobium.

The method of the present invention comprises placing individual nitinol structures in contact with a suitable reacting brazing metal, such as niobium and/or nickel, and heating the nitinol structure and brazing metal at an elevated temperature under vacuum conditions. Niobium reacts with nitinol at a temperature of about 1170° C. which is below the melting point (1310° C.) of nitinol. It has been found that when a suitable brazing metal, such as niobium, is brought into contact with conventional wrought Nitinol at elevated temperature, interdiffusion between NiTi and pure Nb quickly leads to the formation of a liquid phase that aggressively wets both the pure niobium and NiTi, and is "self-fluxing" in the sense that it appears to dissolve oxide scales. The liquid phase flows readily into capillary fissures, and subsequently solidifies or freezes, thereby creating a strong, resilient joint having good strength and ductility. The reactive braze is based on the physical metallurgy of the Ni—Ti—Nb ternary system, and specifically on the apparent existence of a quasi-binary or quasibinary eutectic isopleth [Prema, et al., 1995] involving the reaction NiTi+Nb→$Ni_{38}Ti_{36}Nb_{26}$ (Liq.).

Interfacial reactions of the sort in equation (1), i.e., those that form eutectic liquids at dissimilar alloy junctions, are not uncommon. However, solidification of most non-dilute ternary alloys yields complex microstructures containing embrittling intermetallic phases[1]. In the present process, on the other hand, the terminal phases that result from eutectic freezing of liquid $Ni_{38}Ti_{36}Nb_{26}$ are phases based on austenitic Nitinol and bcc-niobium. Each is a familiar and well-understood metal with attractive physical and mechanical characteristics. For example, both the two-phase eutectic solid, and the individual phases in this constituent, are ductile and tough. Both phases are corrosion resistant [Cherghescu and Constantin 1998, Dong et al., 2000] and thermally stable, and are biocompatible phases [Eisenbarth, 2004]. None of the alloy constituents is exotic or unreasonably expensive.

[1]Special transformational characteristics of the B2 superlattice in NiTi exist in commercial alloys like $Ni_{47}Ti_{44}Nb_9$, in which the effect of niobium is to beneficially widen the temperature hysteresis for SMA connectors [Melton, et al., 1988, Zhang et al., 1990].

Solid state interdiffusion of the brazing metal with an SMA, like nitinol, leads to the appearance of quasibinary (NiTi) and Nb alloy compositions that create a transient liquid phase. Once formed, this liquid readily wets nitinol, as well as other substances, such as stainless steel and molybdenum. The liquid is readily drawn into tight junctions between the nitinol structures by capillary action. After cooling, the liquid brazing metal freezes to create a strong, resilient joint between the nitinol structures. The product of freezing is a quasibinary (NiTi)—Nb eutectic solid that contains two phases, one based on the ordered intermetallic structure of NiTi, and the other based on the disordered body-centered cubic solid solution of Nb, Ti, and Ni. Both solid phases in the eutectic microstructure are ductile. A subsequent heat treatment in the range of about 325° C. to about 550° C., for a period of time of about 5 to about 200 minutes, recovers the excellent shape memory and superelastic properties of the resulting built-up article. When brought into contact with conventional wrought nitinol alloy (NiTi), at a temperature of 1170° C. or above, interdiffusion between the NiTi and pure Nb leads to the formation of a liquid phase that readily wets both the pure Nb and NiTi bodies. This liquid phase readily flows into capillary fissures, and subsequently solidifies into a braze joint material having high strength and good ductility. Furthermore, the solidification product of the braze system possesses good corrosion resistance, a high degree of thermal stability, well-established biocompatibility, and tractable machinability. Mechanical tests have shown that the solidified braze metal is very strong, ductile and tough.

The present joining technique is also applicable to spot-welding shape-memory alloy sheets using conventional resistance-welding techniques. For example, a thin foil of pure niobium is placed between the articles to be joined. Thereafter, under appropriate clamping pressure, an electrical current pulse is passed through the joint with sufficient intensity to cause transient melting. The spot welding technique can be used to hold complex structures together prior to the full brazing process described herein to avoid the necessity to use elaborate fixturing.

The adhering/brazing process described herein can be extended to metal-inert gas (MIG) welding of shape-memory alloys, for example, wherein a pure niobium welding wire is fed into the welding arc which is shielded by an appropriate flow of inert gas. The same principles of fluxless processing, eutectic liquid formation, and the formation of ductile, biocompatible solidification products applies to this MIG method of joining.

The literature on TiNiNb alloys generally confirms two important characteristics: First, the ordered body-centered cubic (bcc) lattice of NiTi can exist in equilibrium with a substantial amount of Nb without losing shape-memory properties, and without causing significant degradation of mechanical properties. The most significant effect of Nb additions is to widen the $A_S$-$M_S$ thermal hysteresis by lowering $M_S$ without appreciably affecting $A_S$. This is considered advantageous for shape-memory connector applications where wide thermal hysteresis increases the allowable service-temperature range [Simpson, et al., 1988, Melton, et al., 1988, Zhao, et al., 1989, Siegert, et al., 2002].

Secondly, excess niobium that does not dissolve in the TiNi superlattice precipitates out as a disordered bcc phase that is relatively soft and ductile. TiNiNb alloys containing up to 10 at % Nb thus display excellent mechanical properties. Good shape-memory properties have been reported for alloys containing up to 21 at % Nb [Siegert, et al., 2002]. Furthermore, in addition to being biocompatible [Eisenbarth 2004], TiNiNb has been found to have excellent corrosion resistance [Dong, et al., 2000] and is machinable [Yufeng, et al., 1996]. [Zheng, et al., 1997] reported that heat treatment at temperatures below 900° C. lowered the yield stress and increased ductility, but also found that heat treatment temperatures above 900° C. decreased tensil elongation. Specimens in this study could be deformed to over 16% at temperatures 30° C. above the $M_S$. Heat treatment at 850° C., followed by furnace cooling, is apparently considered generally advantageous [Zhang 1990]. Finally, Jin, et al., have identified 0.04-0.07 wt % as an optimum oxygen content in $Ni_{47}Ti_{44}Nb_9$ alloys for best shape-memory and good ductility.

In summary, any incorporation of niobium from the braze metal used in the present process will not degrade the mechanical properties of nitinol.

Figure 1:
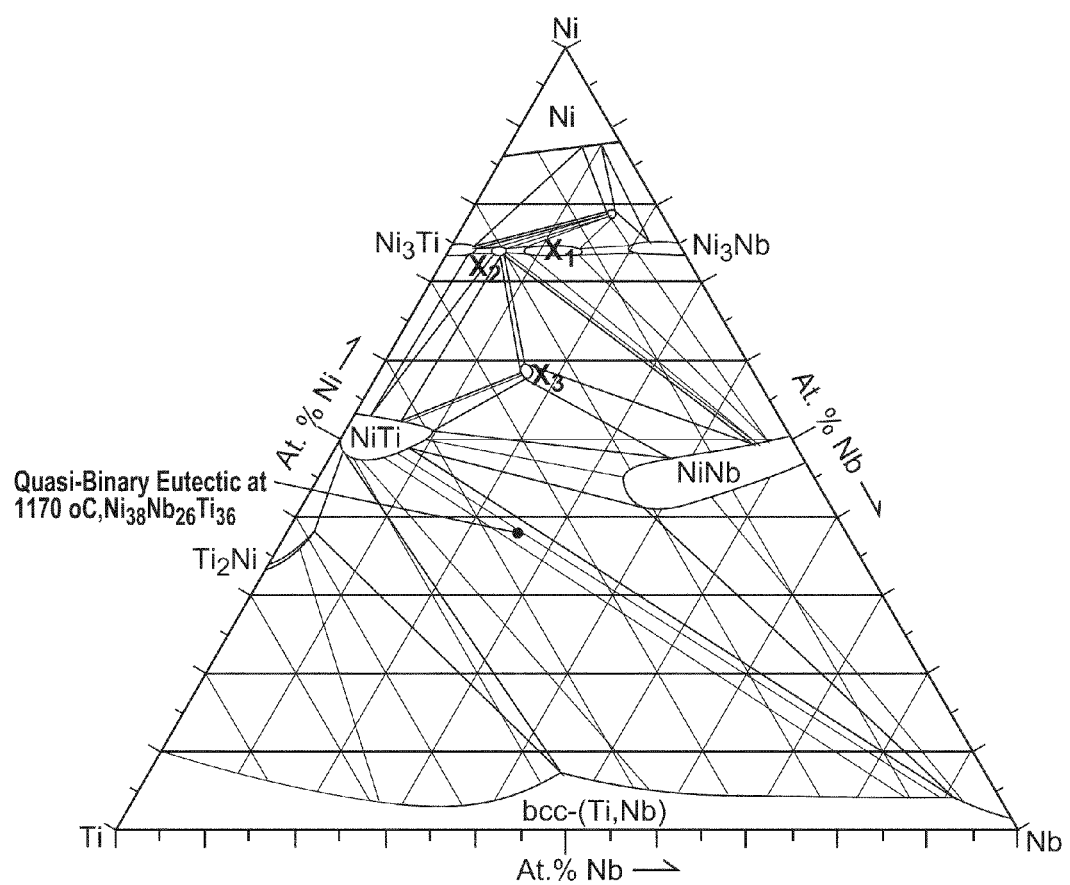
FIG. 1 is a 900° C. section of the ternary phase diagram for the NiTiNb system. Filled regions indicate single phase solid solutions; unfilled triangles are areas of three-phase equilibrium and dashed lines are tie-lines measured by [Prima, et al., 1995]. Data in the NiTi—Ni—NiNb sector in the top third of the diagram are from [Gupta, 1991]. This full isotherm has never before appeared in the open literature.
Figure 2A:
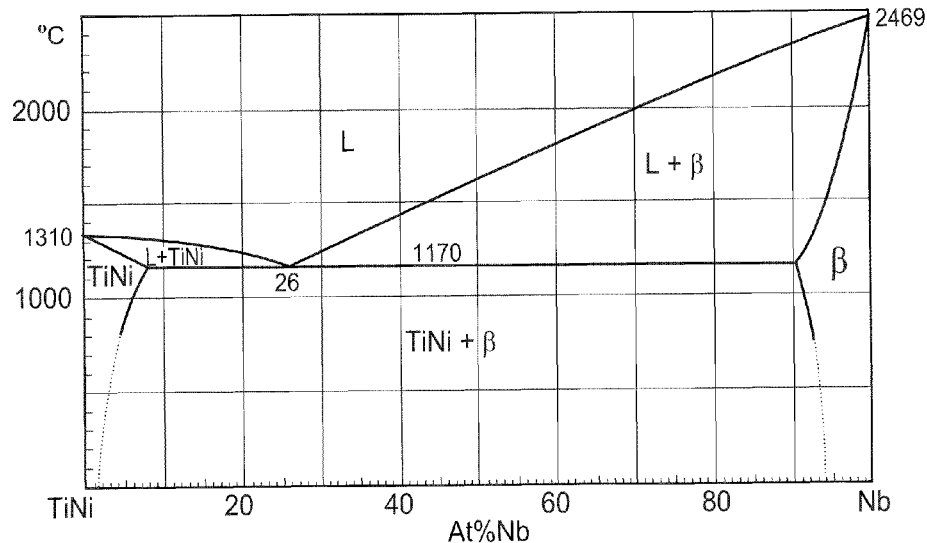
FIG. 2a shows the likely form the quasi-binary isopleth in the Ni—Ti—Nb system.
Figure 2B:
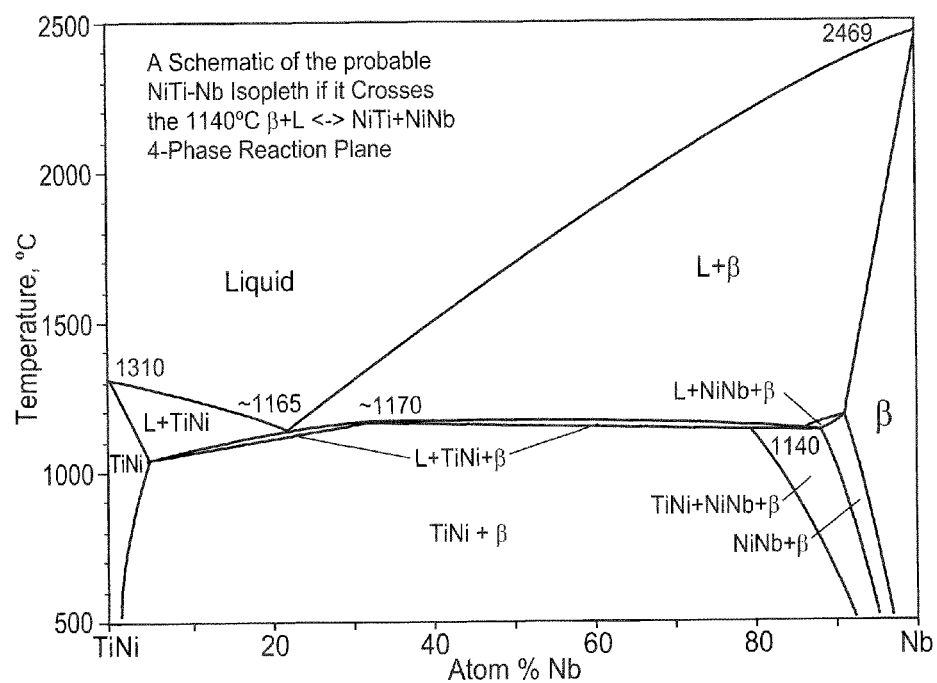
FIG. 2b indicates that the NiTi—Nb quasi binary isopleth may intersect the 1140° C. bcc-Nb+ Liquid <->NiTi+NiNb four-phase reaction plane, in which case the quasibinary isopleth would have the approximate form shown schematically in FIG. 2b. In this case, appearance of the NiNb phase would be possible at equilibrium at lower temperatures, although this phase has never been experimentally observed. For practical purposes, the NiTi—Nb system appears to function as a true quasibinary eutectic system.

An important aspect of the Ni—Ti—Nb system, with respect to the present disclosure, is the complete mutual solubility of Ti and Nb above the titanium α-β transus at 882° C. There evidently exists a wide range of compostions that equilibrate to a disordered body-centered cubic (bcc) phase (indicated on the diagram as the bcc-(Ti,Nb) phase) that has up to ~8 at % Ni solubility at 900° C. A large NiTi+[β-(Nb, Ni, Ti)] two-phase field extends between approximately 6 and 92 at % Nb, indicating the existence of a quasibinary eutectic system between the ordered TiNi phase and the disordered β-(Nb+Ni, Ti) solid solution. [Zhao, Duerig and Wayman, 1989] identified these phases and gave the lattic parameter of the disordered cubic phase as 0.32963 nm, and that of the NiTi phase at 0.30182 nm (slightly larger than the accepted binary NiTi cubic lattice parameter of 0.3015 nm, reflecting the slightly larger atomic radius of Nb compared to that of Ti). The NiTi phase was found to contain approximately 5 at. % Nb in this study. The approximate probable form of the quasibinary isopleth is shown in FIG. 2. This diagram, which has not previously appeared in the open literature, is an estimate based on the established temperature and composition of the quasibinary eutectic (1170° C., at $Ni_{38}Ti_{36}Nb_{26}$ [Prima, et al., 1995]), with liquidus lines extrapolated to the component melting points, and solidus lines extrapolated through solidus temperatures cited in [Prima, et al., 1995].

Compositions wherein the Ni content exceeds that of Ti by 3 at % to 4 at % apparently produce no precipitate particles other than the NiTi and β-(Nb, Ni, Ti) phases. For example, the $Ti_{43.8}Ni_{47.3}Nb_{8.9}$ alloy studied by [Wang, et al., 1999], whose composition approaches the NbNi solvus at 900° C., exhibited no additional precipitates regardless of the heat treatment regimen applied. [Yang, et al., 2002] observed (Ti, Nb)$_2$Ni particles in Nb-containing TiNi SMAs, but only in those produced by combustion synthesis from elemental powders, for which Ti:Ni ratios may not have been equiatomic during some stages in the process. A hard and potentially embrittling $Ti_3(Ni,Nb)_3$ phase, however, was observed by Zhang, et al., (1991), in a $Ni_{47}Ti_{44}Nb_9$ alloy subjected to hot working. For this reason, the observation of [Jia, et al., 2000[, that alloy additions of vanadium and zirconium can suppress the formation of (Ti,Nb)$_2$Ni precipitates is important. The data in [Prima, et al., 1995] indicates that the NiTi—Nb quasibinary isopleth may intersect the 1140° C. bcc-Nb+Liquid<->NiTi+NiNb four-phase reaction plane, in which case the quasibinary isopleth would have the approximate form shown schematically in FIG. 2b. In this case, appearance of the NiNb phase would be possible at equilibrium at lower temperatures. For practical purposes, the NiTi—Nb system appears to function as a true quasibinary eutectic system.

Ordered intermetallic compounds generally are brittle phases having poor mechanical properties. Equiatomic TiNi, which can display up to 50% room-temperature ductility, is an exception to this general rule, and the literature indicates that substantial dissolved niobium does not seriously compromise ductility of this compound. On the other hand, body centered cubic solid solutions, which have a large number of independent dislocation slip-systems, often show excellent ductility and high strength. Thus, the existence of a quasibinary eutectic system between TiNi and the disordered β-phase, both of which are substantially ductile, is unexpected. This applies even though it has not necessarily been critical to the historical development of wide-hysteresis shape-memory materials exemplified by $Ni_{47}Ti_{44}Nb_9$.

This quasibinary NiTi—Nb system, having terminal phases with low mutual solubility, a eutectic temperature 140° C. below the melting point of nitinol, and which produces no brittle intermetallic phases, has not previously been fully appreciated and forms the thermodynamic basis for the new brazing method described herein.

Figure 3:
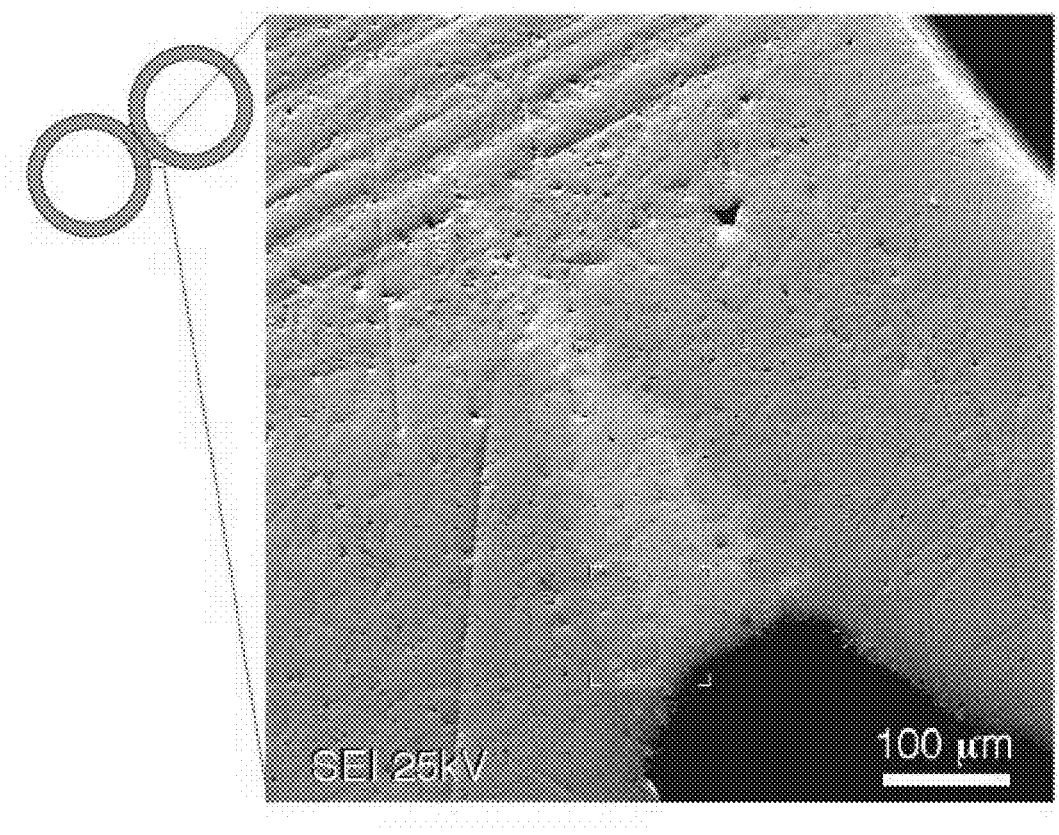
FIG. 3 is a scanning electron micrograph (secondary electron image or 'SEI') of a braze joint between two ⅛-inch diameter extruded superelastic NiTi tubes (shown schematically in the upper left-hand corner). The joint was formed by heating the pair of tubes in the presence of a 0.020" diameter pure niobium wire to a temperature of 1170° C., holding for 5-10 minutes, and then furnace cooling. The section has been mechanically polished but has not been etched.

Microstructure:

Experimental observation of solidified braze joints made by the process generally confirms the existence of the quasibinary eutectic system. FIG. 3 shows a braze joint that had been made between a pair of ⅛ inch diameter nitinol tubes. The tube curvature, as well as the meniscus shape of the solidified braze, is visible. The solidified braze metal is seen in contain two distinct regions, one light-colored and central, and on of intermediate lightness adjacent to the tube walls which has a bulbous morphology.

Figure 7:
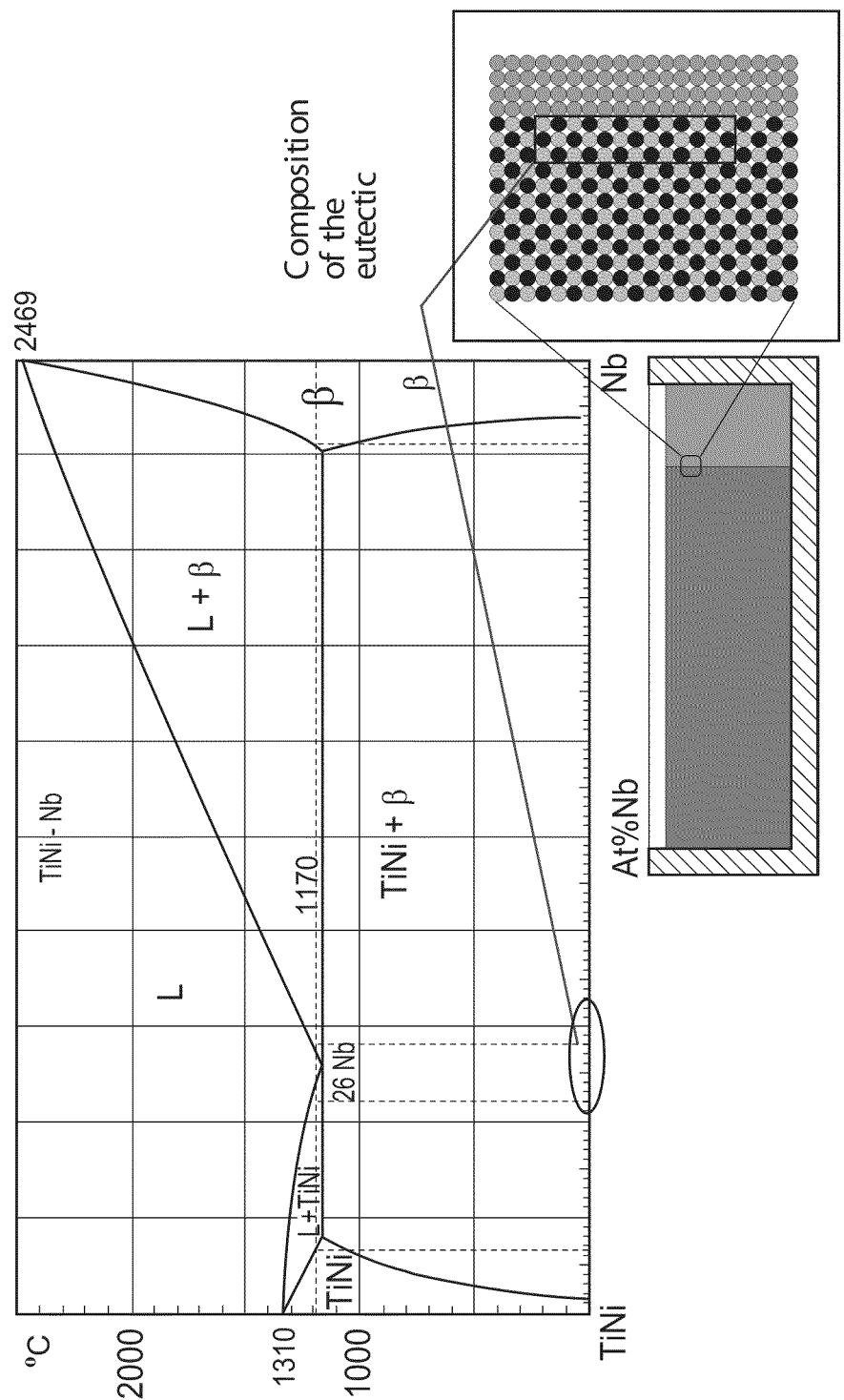
FIG. 7 is a diagram of the eutectic composition of the interface metal. By volume, the eutectic composition of $(NiTi)_{74}Nb_{26}$ (at %) is $NiTi_{68.3}$v/o; $Nb_{31.7}$ v/o. Thus, 2.15 m³ of TiNi are consumed for every 1.0 m³ of pure Nb to form the eutectic liquid. Thus, consuming 1 m³ of Nb forms approximately 3 m³ of eutectic liquid.

X-ray fluorescence maps for Nb L-α, Ni K-α and Ti K-α radiation taken from this magnified portion of the field of FIG. 3 are shown in FIG. 7 and confirm that the solidified braze contains two distinct microconstituents. For the bulbous zone directly adjacent to the tube surfaces the Nb L-α map indicates a small but detectable amount of niobium, together with much larger and approximately equal amounts of Ti and Ni. Between the bulbous regions lies a second, central zone, with complimentary morphology, that is rich in niobium and contains a substantial presence of both Ni and Ti.

Figure 5:
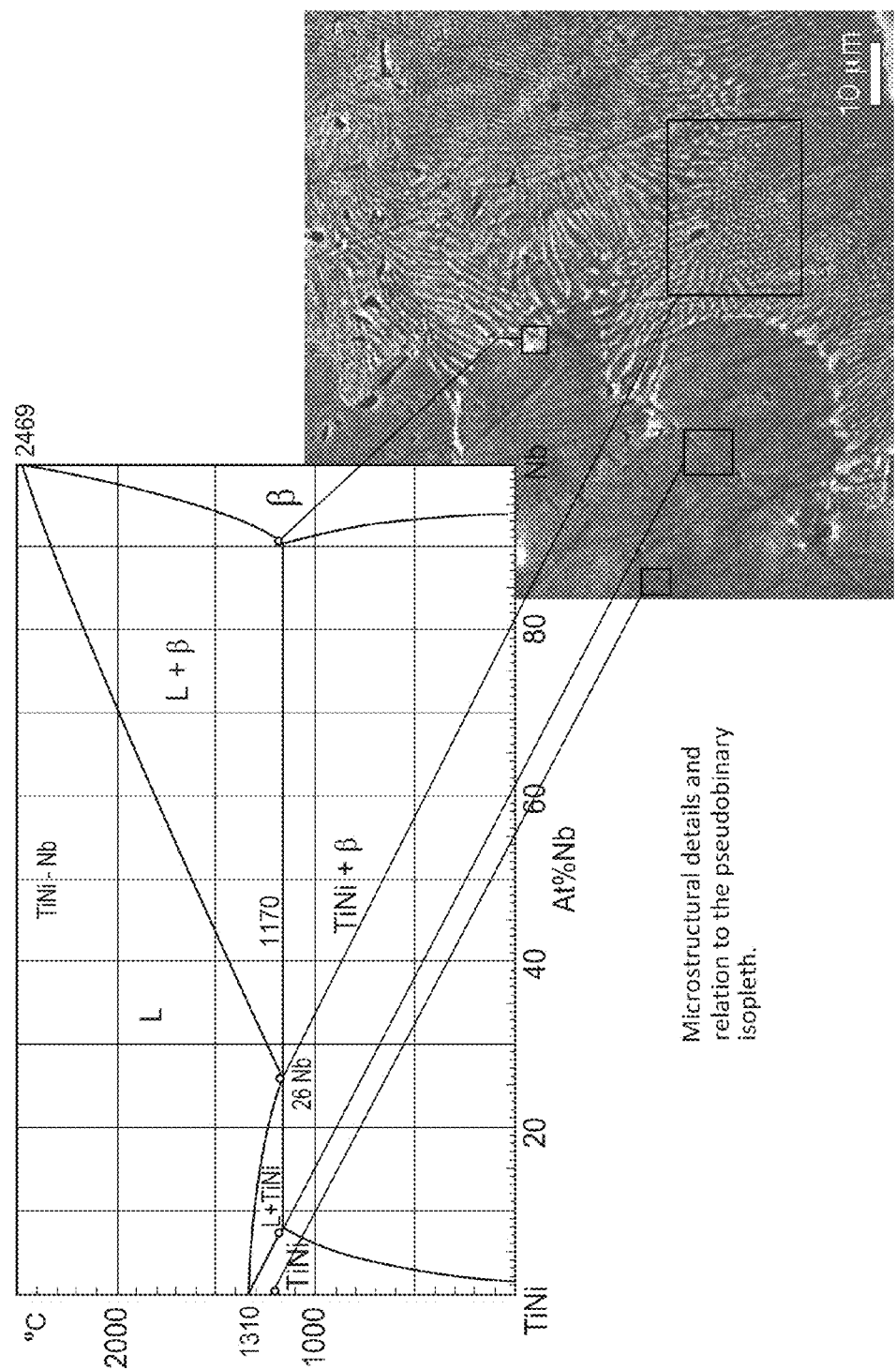
FIG. 5 is a scanning electron micrograph showing microstructural features in the box indicated in the leftmost X-ray map of FIG. 3 in which the compositions of the phases are keyed to their compositions as they would appear on the quasi-binary phase diagram. The lowest line indicates the pure, unmelted NiTi phase; the next higher line indicates the proeutectic NiTi phase formed by constitutional freezing after niobium exhaustion; the next higher line indicates the eutectic solidification product that forms during cooling from the brazing temperature; and the top line indicates the nearly pure niobium phase that is one of the phases in the eutectic microconstituent.

The higher magnification micrograph in FIG. 5 indicates that the central region is indeed a eutectic solidification zone. The bulbous zone adjacent to the pure NiTi surface has been identified as a proeutectic constitutional solidification zone form after melting has exhausted the supply of pure niobium. This zone freezes isothermally (i.e., without cooling below the braze process temperature) as Nb diffuses from the liquid into the adjacent NiTi. Since Nb lost from the liquid in this way can no longer be replaced, equilibrium can be maintained by only formation of the Nb-lean proeutectic TiNi phase, as discussed further below.

Transient Liquid Formation

Figure 6:
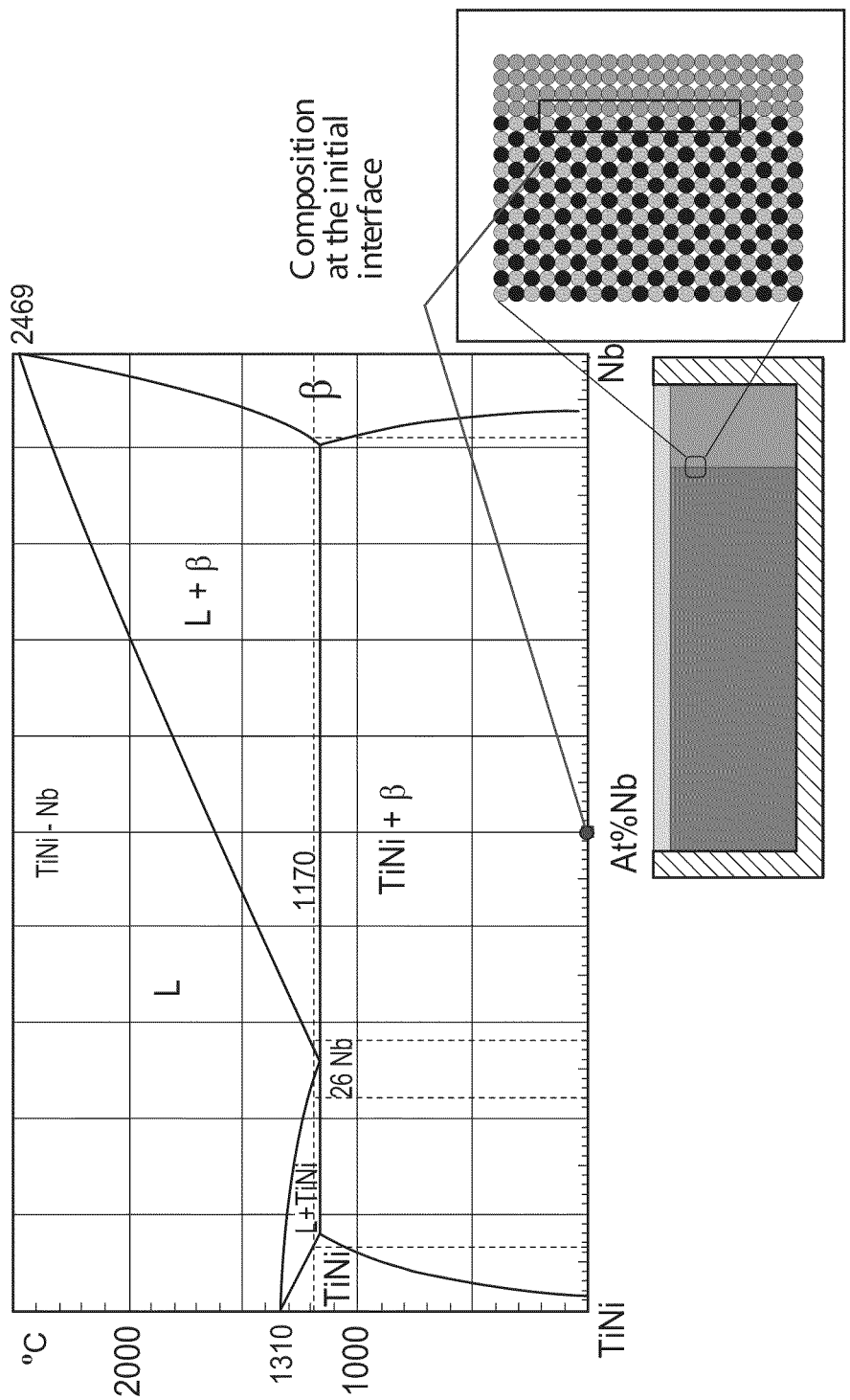
FIG. 6 is a diagram of the composition of the SMA/niobium interface. At the interface, the first monolayer pair has approximately the composition $Nb_{50}Ti_{25}Ni_{25}$. By average surface area atom densities (atoms per square meter), the nominal interface composition (composition of the contacting atomic monolayers) is $Ni_{28.5}Ti_{28.5}Nb_{43}$.
Figure 8:
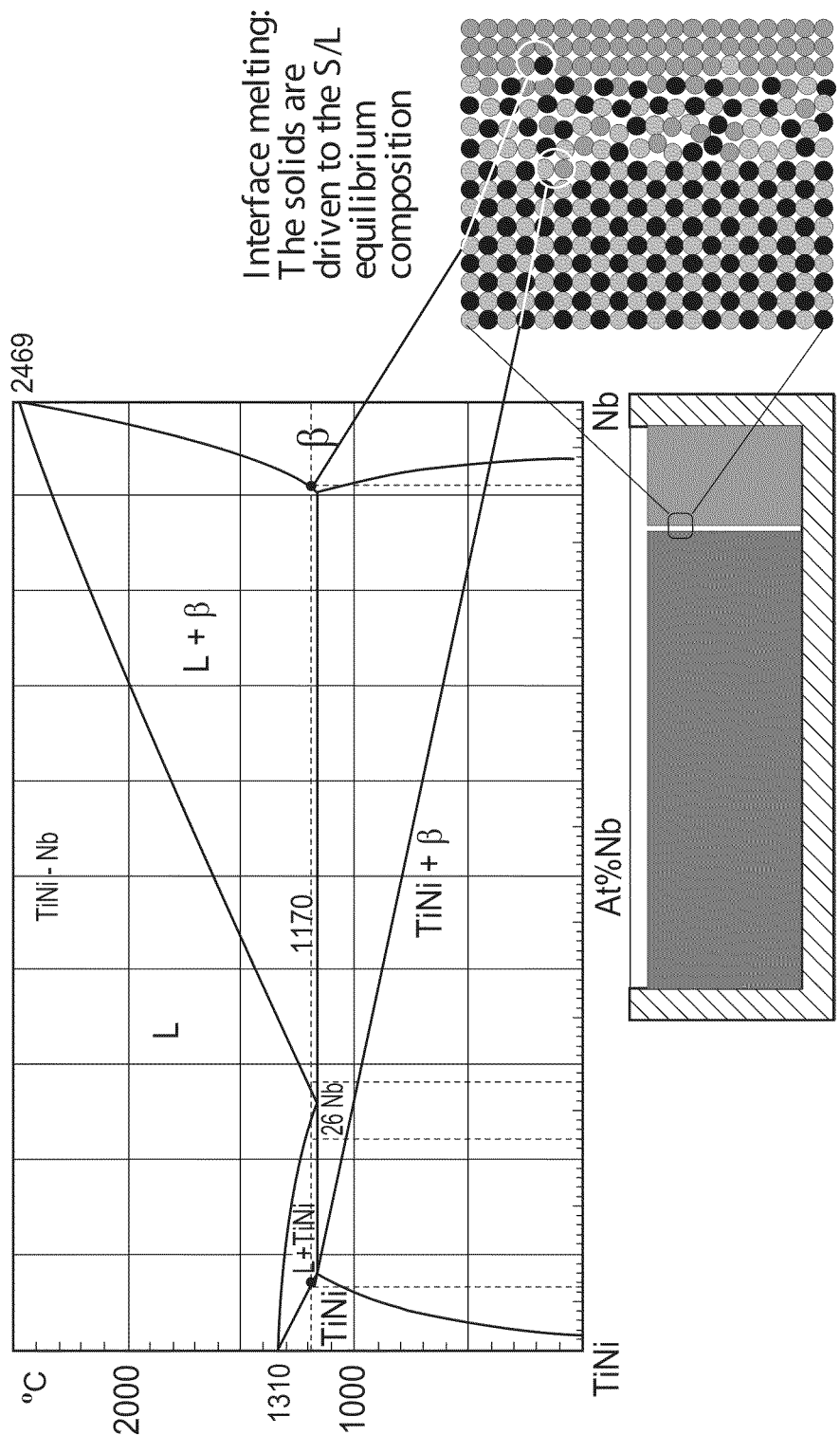
FIG. 8 is a diagram of the interface metal showing that at 1200° C., the junction is unstable as a solid and melts, probably without a significant incubation period. As soon as the liquid forms, the solid/liquid interfaces will be forced the their equilibrium compositions.
Figure 9:
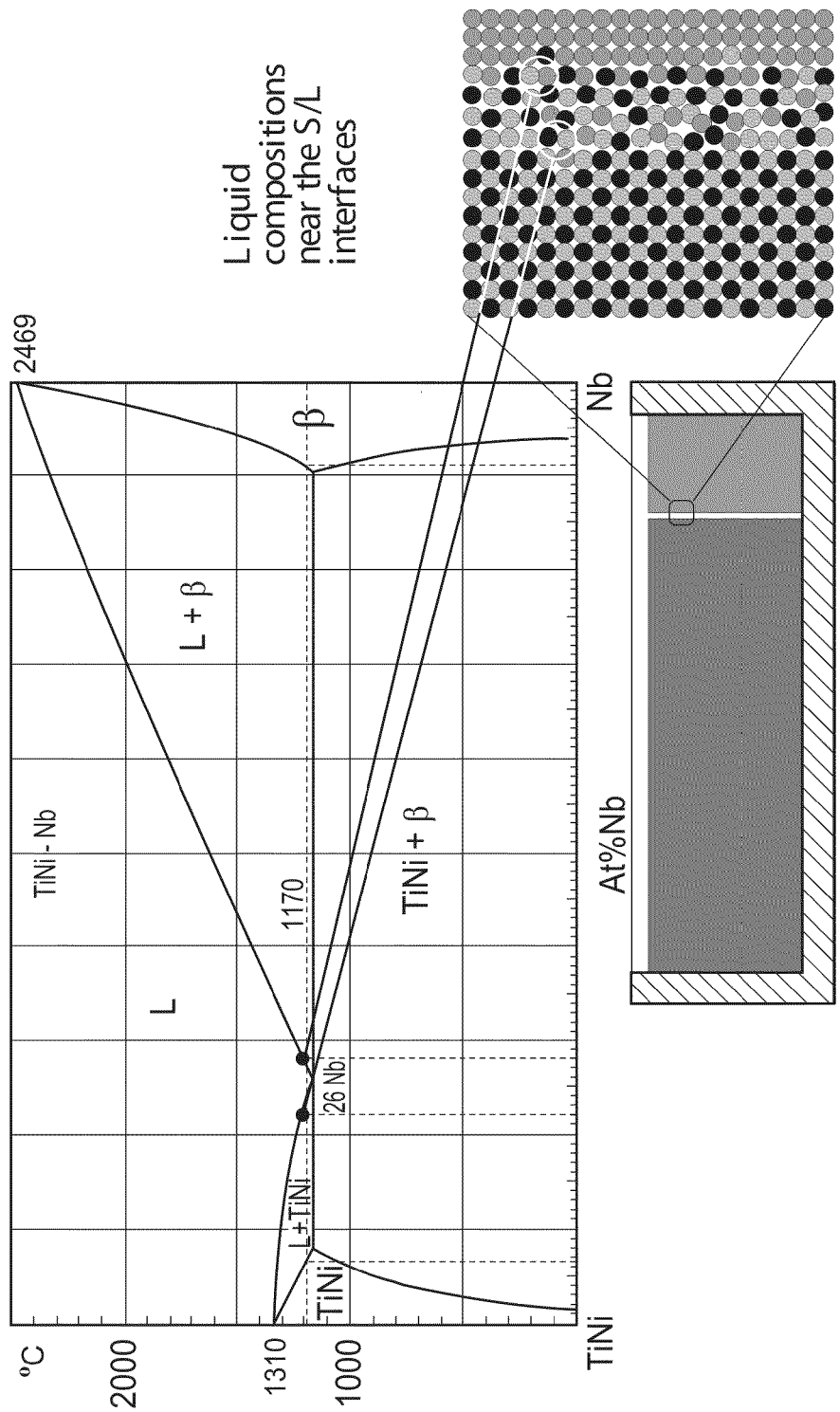
FIG. 9 is another diagram of the interface metal. Though the liquid has approximately the eutectic composition $(Nb_{26}Ni_{38}Ti_{36})$, the 1200 degree tie line shows a few percent composition change across the liquid. That is, on the TiNi side, the solid is in equilibrium with $Nb_{22}Ni_{40}Ti_{38}$, while the Nb side has a solid in equilibrium with $Nb_{28}Ni_{37}Ti_{35}$. This gradient drives cross-diffusion of NiTi and Nb that promotes the melting process since the interface equilibrium compositions can only be maintained by continuous melting of both pure Nb and TiNi.

It is clear from the quasi-binary diagram that an interface between solid NiTi and pure Nb is unstable and will spontaneously melt at temperatures above 1170° C. Based on the average atom densities at the NiTi and Pure Nb surfaces, the composition of the contacting monolayers would have a composition of approximately $Ni_{28.5}Ti_{36}Nb_{26}$, lying well within the unstable L+Nb region of the quasi-binary isopleth, as shown schematically in FIG. 6. The first liquid to appear at the contact would, however, have a composition of near the eutectic at $Ni_{38}Ti_{36}Nb_{26}$, as shown in FIG. 7. The solids in contact with the liquid would have their interface compositions driven to the solidus lines as shown in FIG. 8. Assuming that the system stays close to equilibrium at the solid-liquid interfaces, and the liquid forms simultaneously at the surfaces of both the solid phases, the liquid zone must contain a composition gradient that would drive transport of (Ti+Ni) toward the Nb-rich solid, and vice-versa, causing the size of the melt to increase steadily until the source of niobium is exhausted. This is because (at temperatures above the eutectic) the equilibrium composition of the liquid is different at the liquid-NiTi interface than at the liquid-Nb interface, as shown in FIG. 9.

It is apparent in FIG. 3 that niobium is confined to the capillary zone between the tubes and has not significantly (less than 10% by weight) penetrated the adjacent tube walls. It also is apparent that niobium is not homogenously distributed within the braze region, but is combined with globular regions that contain large amounts of Ti and Ni. As described with reference to FIG. 6, the interface composition is $Ni_{28.5}Ti_{28.5}Nb_{43}$. The eutectic composition is $Ni_{38}Ti_{36}Nb_{26}$. Higher magnification scanning electron micrographs (SEM images) reveal that the niobium is concentrated in a two-phase region that is recognizable as a eutectic solidification zone, and that the globular features richer in TiNi are homogenous single-phase zones. The latter, therefore, is identified as the proeutectic phase whose formation is described further below.

Initial investigation indicates that the liquid forms with sufficient speed that rather little diffusion of Nb into the NiTi body (and vice-versa) occurs.

When all sources of pure Nb are exhausted (which might involve cutoff of the liquid from the Nb source as it flows into capillary spaces), the liquid will still be in contact with solid NiTi. As niobium continues to diffuse from the eutectic liquid into solid NiTi, the NiTi-liquid interface is forced away from the equilibrium composition. The later can only be restored by freezing out a single-phase TiNi-rich proeutectic microconstituent. When solid proeutectic TiNi (with about 8% dissolved Nb) is deposited on the solid-liquid interface, the Nb content of both the liquid and the interface are restored to the equilibrium levels. Thus, following Nb-exhaustion, proeutectic TiNi will steadily freeze out at the liquid-NiTi interface. If allowed sufficient time, as dictated by the solid-state diffusivities, the liquid will eventually disappear, giving rise to the designation of the process as a 'transient-liquid' type braze. Preferably, the brazing metal is diffused into the SMA less than 10% by weight. We thus interpret the microstructure in FIG. 5 as having arisen because the specimen was cooled below the eutectic temperature before all of the eutectic liquid had been consumed. No unreacted Nb phase has been detected in these specimens, indicating that the contact melting reaction proceeds very quickly. Unreacted Nb has more recently been detected in specimens held at the brazing temperature for a very short time, however. Mechanical tests indicate that the best properties are obtained for short brazing times, indicating that the eutectic solidification product has better mechanical properties than the proeutectic NiTi phase.

Figure 10:
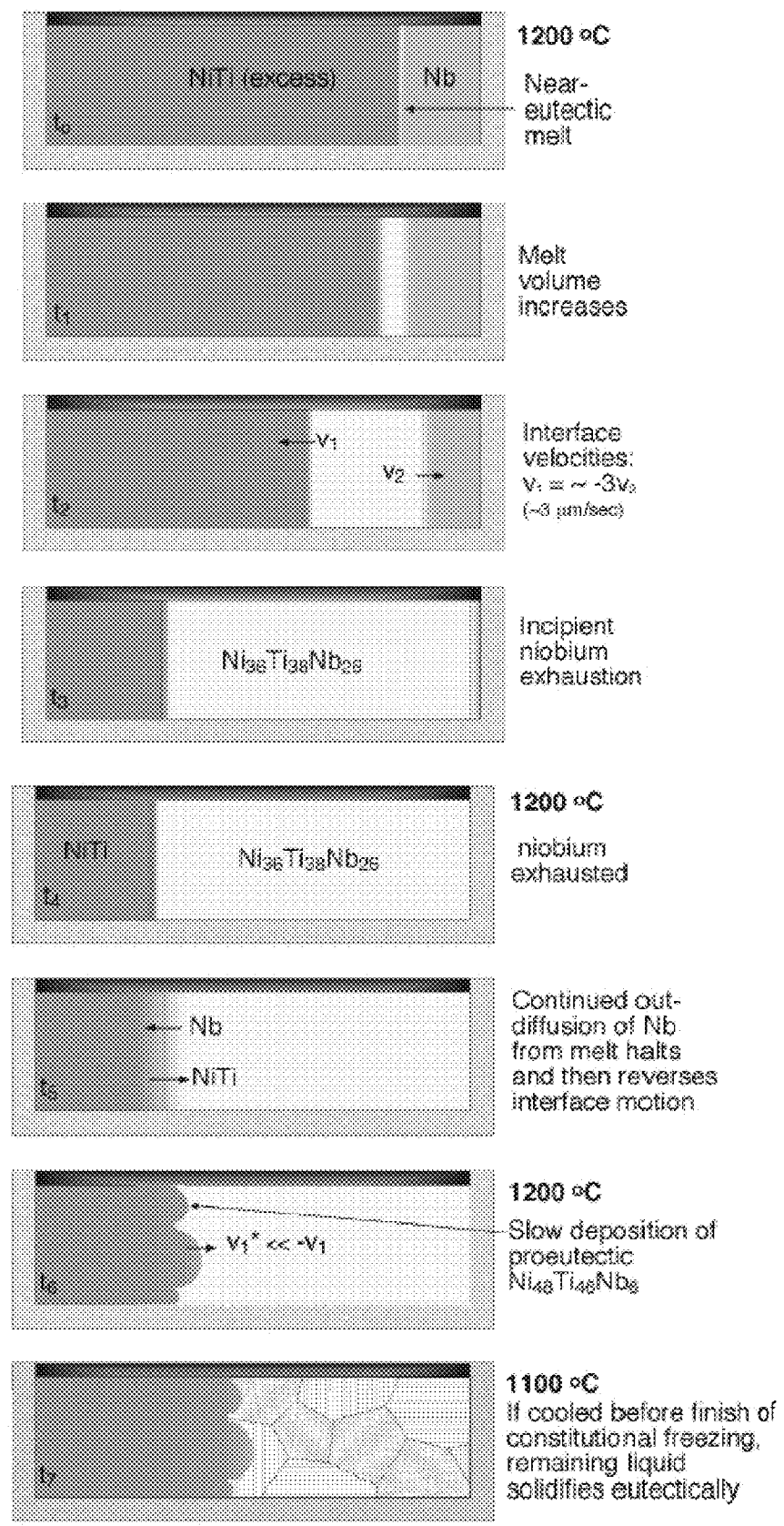
FIG. 10 is a series of diagrams of the interface metal at various stages of braze formation. Since niobium is present in limited quantity, this species is eventually consumed. As soon as no fresh Nb is available to the melt, continued (slow) diffusion of TiNi into the melt, and Nb into the NiTi solid, causes the melt to solidify constitutionally, depositing solid NiTi+Nb onto the NiTi S/L interface: The melt interface velocity, v1* slows and changes sign. Following Nb depletion, continued diffusion of Nb into bulk NiTi causes constitutional freezing of the remaining liquid, forming proeutectic solid NiTi(Nb) which is deposited on the TiNi-liquid interface. Freezing is controlled by bulk diffusion and is therefore relatively slow.
Figure 11:
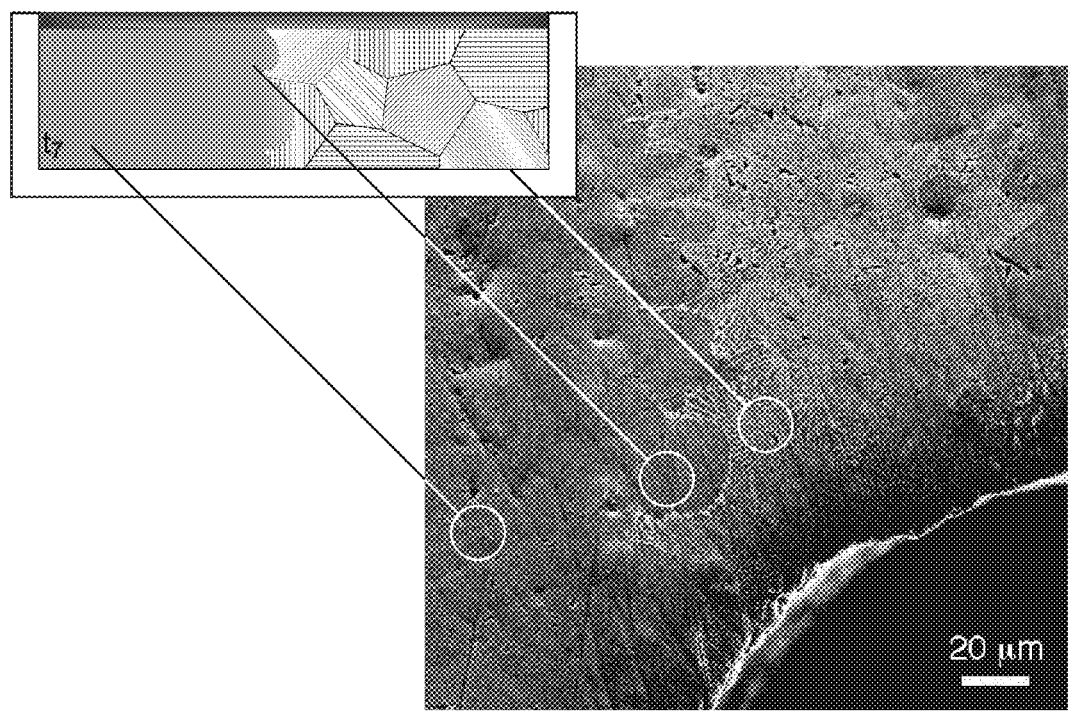
FIG. 11 is a closer view, similar to FIG. 10. The closer view indicates the presence of the unmelted NiTi, the proeutectic NiTi+Nb phase, and the needle/lamellar microstructure of the eutectic solid (formed on cooling)

The melting, proeutectic constitutional freezing, and eutectic freezing sequence is shown schematically in FIG. 10. The phases found in FIG. 3 may be keyed to the schematic of FIG. 10, as has been indicated in FIG. 11.

Mechanical Behavior

The following describes Examples of open-cell superelastic nitinol honeycomb structures manufactured in accordance with the brazing method described herein.

Initial Experiments

Figure 12:
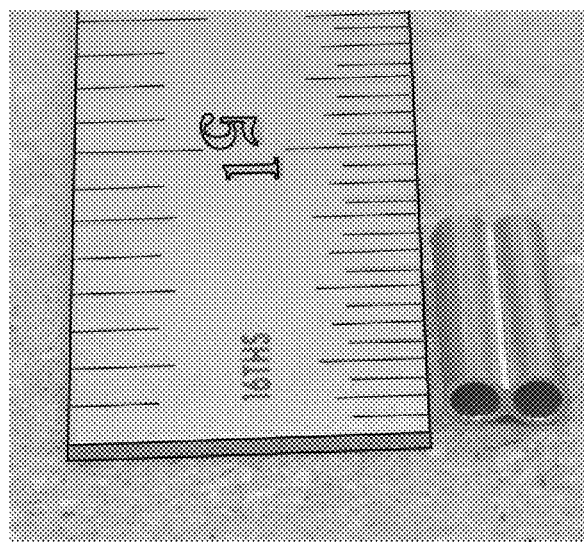
FIG. 12 is a photograph showing two Nitinol tubes bonded by the process described herein.
Figure 13:
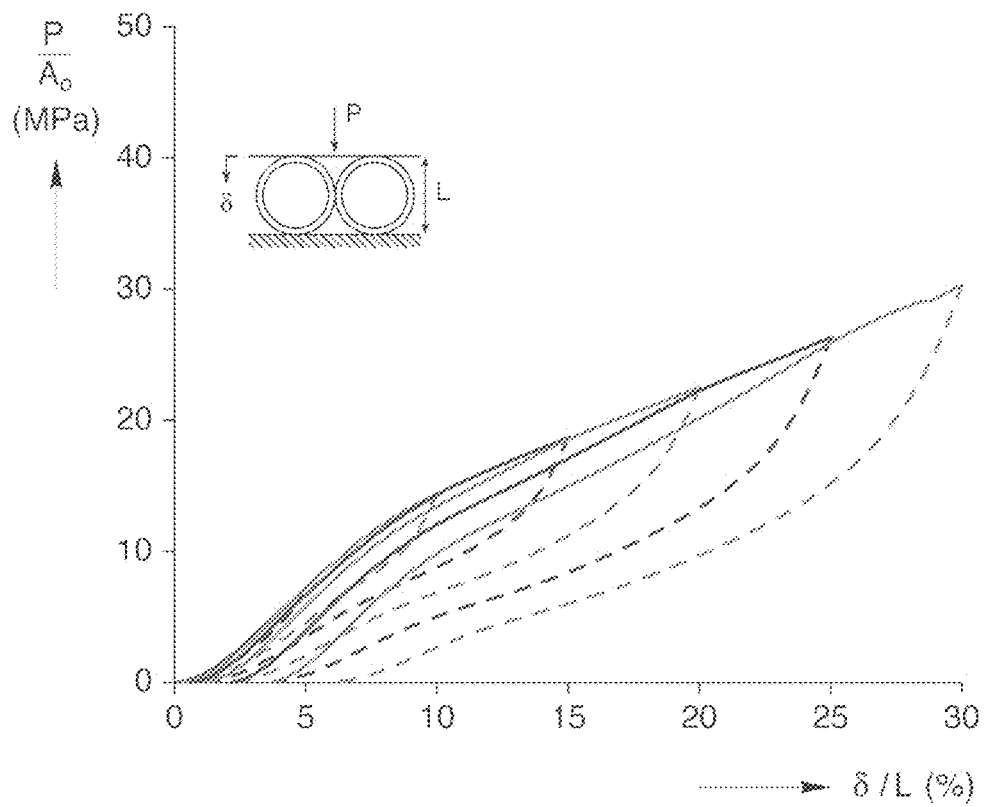
FIG. 13 is a diagram showing that the braze bonding achieved between the nitinol tubes of FIG. 12 exhibits incremental compression, exhibiting superelastic behavior.

FIGS. 12, and 13 and 14 show photographs and performance data for the first prototypes made from tubes joined by the brazing process described herein.

Specimen Fabrication

Honeycomb specimens, as shown in FIG. 16, were fabricated from 5.2 mm wide×0.2 mm thick rolled nickel-rich Nitinol strip obtained from Memry Corporation, Brookfield Conn. Based on differential scanning calorimetry the strip material had the transformation temperatures $A_S$=25° C., $A_f$=7° C., $M_S$=54° C., and $M_f$=−75° C. Therefore, even after significant thermal processing the Nitinol material was expected to be superelastic at room temperature. The strips were first shape-set into corrugated forms at 500° C. for 10 to 30 minutes using stainless steel dies as indicated in FIG. 15, which also shows details of both bi-cylindrical and hexagonal corrugation forms[2] used in the present experiments. After shape-setting, the corrugated strips were etched in a solution containing 50 mL $HNO_3$, 38 mL HCl, and 17 mL HF to remove surface oxides[3]. In the case of the hexagonally corrugated strips, the honeycomb layup was assembled with small 50.8 micron thick square pieces (~3 mm×3 mm) of 99.7% pure niobium foil placed between the contacting faces. Bi-cylindrically-corrugated strips were assembled together with 0.127 mm diameter pure niobium wires on either side of each contact zone.

[2] The die dimensions in this figure differ slightly from those of the final honeycombs due to spring-back and process-induced deformations.
[3] Although it has been observed that bonding takes place in the presence of surface oxides (and is relatively insensitive to oxidation during vacuum processing at high temperature), removal of gross oxide scales reduces contamination of the braze material itself and probably improves braze toughness.

The assembled layup was lightly secured in TZ-molybdenum support fixtures and washed in acetone and ethanol. No fluxing agents were used. Brazing was conducted in a Centorr M60 tungsten-element diffusion-pumped vacuum furnace evacuated to a base pressure of $7 \times 10^{-6}$ Torr. Once the base pressure was attained, the specimens were heated quickly to between 1175 and 1200° C., held for a brief period, e.g., 30 seconds, and then furnace cooled. After removal from the vacuum furnace, the as-brazed honeycombs were given an aging (annealing) treatment at between 450 and 515° C. for about 90 minutes prior to compression testing. Table 1 gives some geometric data and the processing history for each specimen tested. Note that t is the nominal ligament thickness and d is the nominal cell diameter. The temperatures listed should be considered approximate, since the exact temperature history of the specimen was affected by the thermal inertia of the chamber and fixtures.

TABLE 1

| Example | 1 | 2 | 3 |
| --- | --- | --- | --- |
| t (mm) | 0.19 | 0.10 | 0.10 |
| d (mm) | 5.55 | 5.38 | 4.8[4] |
| Braze temperature (° C.) | 1175 | 1175 | 1200 |
| Braze time (sec) | 90 | 300 | <10 |
| Aging temperature (° C.) | 514 | 514 | 520 |
| Age time (sec) | 600 | 600 | 600 |

[4] Cell size is based on the diameter of the resulting bi-cylindrical arc.

Mechanical Experiments

Three lateral crushing experiments are presented on different specimens that were initially austenitic, one on a short hexagonal honeycomb (Example 1), one on a taller hexagonal honeycomb (Example 2), and one on a bi-cylindrically-corrugated honeycomb structure (Example 3). The products of Examples 1-3 were tested for in-plane crushing using an Instron 5585 electro-mechanical testing machine. All testing was performed in room temperature air (22.2 to 22.8° C.) under quasistatic displacement control. Digital optical photographs were taken periodically using a Nikon D100 camera fitted with a 105 mm Micro Nikkor lens.

FIG. 16a shows an image of a specimen at the start of Example 1, together with a schematic (FIG. 16b) of the arrangement defining the vertical length (L) between platens and the downward displacement (δ) of the upper platen. The silver strips seen on the front of the platens are reflective tags used with an EIR model LE-05 laser extensometer to accurately measure platen displacement and to serve as a cross-check on the strain measurement derived from the crosshead displacement. Example 1 and 2 were performed at an average strain rate, $\delta/L=3.33\times10^{-3}$ s$^{-1}$, while Example 3 was performed at $\delta/L=1.67\times10^{-3}$ s$^{-1}$. The mechanical response is reported as the compressive load, P, divided by the projected cross-sectional area, $A_0$, (the total footprint area, including the area of the incomplete cells at the edges) perpendicular to the loading direction, to give a macroscopic measure of compressive stress. Various strain histories were imposed to probe the effective superelastic strain recovery properties, residual strain, and cyclic ratcheting.

The results of Example 1 are shown in FIG. 17. FIG. 17a shows the prescribed compressive strain history in which the 2½×6 cell specimen was crushed to 70% strain, unloaded to zero load, and reloaded for five cycles. The mechanical response is shown in FIG. 17b as a compression stress-strain plot. The first loading segment exhibits an initial linear response up to about 0.4 MPa, with a tangent modulus of about 7.1 MPa associated with nearly uniform deformation of the honeycomb cells. Subsequently, a knee occurs in the response and the tangent modulus decreases as the lower row of cells buckles due to stress-induced martensite transformation (A→M). (The circled numbers in the figure correspond to times at which high-resolution digital images, shown in FIG. 17c, were acquired). As crushing proceeds the stress continues to rise between times 1a and 1d. An angled band of deformed cells starts to form, although the specimen has too few cells to exhibit well-developed shear bands like those seen in [Papka and Kyriakides 1994, 1998]. Irregularities in the mechanical response correspond to events associated with buckling of certain cell rows. Note, for example, the small inward dimples that occur in the horizontal flats of the lowest cell walls. These can be seen more clearly in FIG. 17d (image 1e at 70% strain). Between times 1d and 1e, internal contact has occurred between some cells causing the load to rise steeply.

At time 1e the upper platen motion is reversed to unload the specimen. The unloading tangent modulus is initially relatively steep (19.1 MPa), but then decreases as the reverse martensite-to-austenite (M→A) transformation occurs. After complete unloading the residual strain is 13.6%. This first cycle shows a wide hysteresis, but in subsequent load-unload cycles the hysteresis diminishes sharply, and nearly repeatable mechanical response is obtained. A small amount of transformational softening and cyclic ratcheting still occurs, however, and the residual strain is ~17.9% after the fifth cycle (point 5a). The lack of perfect cyclic stability was of some concern, but it was found that thermomechanical processing eliminated this behavior as will be shown in the following Example 3. Cyclic stability can also be improved further by developing optimal heat treatments. Nevertheless, the repeated recovery of over 50% strain upon unloading clearly demonstrates, for the first time, a superelastic Nitinol honeycomb.

The results of Example 2 are shown in FIG. 18, showing the imposed strain history, mechanical response, and selected specimen images during crushing and recovery. In this case a similar hexagonal honeycomb specimen was used, except that the brazing time during manufacture was longer than for the previous specimen (300 seconds compared to 90 seconds at 1175° C.), the ligament thickness was thinner (t=0.1 mm compared to 0.19 mm), and the specimen had more cells (4½ cells high by about 7 cells wide). The deformation history is comprised of incremental strain cycles, in 5% steps, with residual strain accumulation measured after each unloading cycle.

Stress-strain response is shown in FIG. 18b. A limit load is seen in the response on the fifth cycle, near 22% strain, where a local band of highly deformed cells has formed, yet the honeycomb recovers to a uniform configuration upon unloading. The final cycle, taken to 60% compressive strain, is shown by the bold line in FIG. 18b. The closure of the loop shows only about 1.3% unrecovered strain and it clearly shows a wide hysteresis and nonlinear behavior typical of a superelastic material undergoing bending deformation.

FIG. 18c shows a series of optical images of the specimen, at ⓪ before loading, at ⑫ for 60% strain, and at 12a corresponding to the final unloaded configuration with about 7.3% residual strain. Advantageously, the deformed configuration ⑫ displays a generally symmetric pattern with respect to a vertical plane, with a single relatively undeformed cell at the lower middle location.

The results of Example 3 are shown in FIGS. 19 and 20. The specimen was a 4½×11 cell bi-cylindrically-corrugated honeycomb. The brazing of this specimen was performed at 1200° C. for just 1 second, but the specimen had a similar aging treatment as the previous two (Examples 1 and 2). The ligament thickness was about 0.1 mm, similar to the specimen used in Example 2. The experiment was conducted in stages. FIG. 19a shows results from four initial cycles in which the first three are incremental in 5% strain steps and the fourth is a repeat cycle at 15% strain. The residual strain is less than 0.2%. FIG. 19b shows subsequent incremental cycle numbers 5 to 11 using larger scales on both the strain and stress axes. The residual strain after cycle 11 is about 8.2%. FIG. 19c shows cycles 12 through 15 taken repeatedly to a maximum strain of 50%, and the residual strain after cycle 15 is about 11.2%. By cycle 15 the mechanical response has nearly stabilized to a limit cycle as the rate of change of residual strain has slowed. FIG. 19d shows three subsequent incremental cycles (16 through 18) followed by repeated cycling to 70% strain (cycles 19 through 22). FIG. 19e shows selected images acquired during the experiment: the initial unloaded specimen at ⓪, the specimen crushed to 30% at ⑦ and 50% at ⑪ (Note the formation of a band of highly deformed cells in the image), the unloaded specimen after cycle 11 at 11a, the specimen crushed to 70% at ㉒, and finally the unloaded specimen at 22a after 22 cycles showing about 20.2% residual strain.

As seen in FIG. 19d the stress-strain response abruptly steepens as the compressive strain nears 70%, when significant internal contact between layers begins to occur (see again image ㉒ in FIG. 19e). This strain may be compared to the theoretical strain at full densification, which is about 93% based on the ligament thickness. The sudden drop in stress near 65% strain is apparently an unloading event associated with the change in deformation from a heterogeneous pattern to a more homogeneous one corresponding to the exhaustion of a shear band. Then, the response stiffens due to significant internal contact. Similarly, the sudden rise in stress during unloading near 46% strain appears to be a deformation mode shift from homogeneous to heterogeneous (at the onset of a deformation band) as the reverse transformation (M→A) unloads cell rows one at a time. Interestingly, similar features have been observed in tensile experiments on NiTi wires where transformation exhibits propagating fronts that coalesce on loading and nucleate during unloading (see, for example, [Shaw and Kyriakides 1997]).

Following the experiments of Example 3, in Example 3a, the specimen of Example 3 was heated in air to about 350° C. for 15 seconds caused a thermal strain recovery of 5.6% via the shape-memory effect. This reduced the final unrecoverable strain to 14.6%, indicating that some martensite remained in the specimen following the compression cycles. This clearly demonstrates that the deformation of the honeycomb involved stress induced martensite.

At this point the gage length was redefined to L=10.4 mm to reflect the new set shape, as if the previous thermomechanical history were a preconditioning regimen. Three subsequent mechanical cycles of the specimen of Example 3a were then performed to 35.8% strain as shown in FIG. 20a, with three selected images of the specimen shown in FIG. 20b. The repeatability of the cyclic response is seen to be excellent, producing essentially no residual strain. The response has a smaller hysteresis than the virgin material. Once preconditioned in this way, the shape of the stress-strain curve resembles that of a filled elastomer.

A summary of selected effective properties is presented in Table 2, including the initial tangent modulus ($E_t^*$), effective elastic modulus ($E^*$) upon initial unloading, and effective stress at onset of transformation ($\sigma^*$). In all experiments, the tangent modulus on initial loading is lower than the unloading modulus, especially in the first cycle, due to the hysteretic behavior of the material and nonlinearity arising from the changing contact area with the platens. The unloading modulus is expected to provide a better indicator of the true elastic behavior of the material.

TABLE 2

| Example | $E_t^*$ (load) (MPa) | $E^*$ (unload) (MPa) | $\sigma^*$ (MPa) | Geometric Factors $(t/d)^3$ ($\times 10^{-6}$) | $(t/d)^2$ ($\times 10^{-4}$) | Scale Factors $\frac{E^*/E_A}{(t/d)^3}$ | $\frac{\sigma^*/\sigma_0}{(t/d)^2}$ |
|---|---|---|---|---|---|---|---|
| 1 | 7.1 | 19.1 | 0.35 | 41 | 12 | 6.6 | 0.73 |
| 2 | 2.2 | 3.60 | 0.10 | 6.7 | 3.6 | 7.6 | 0.69 |
| 3 | 1.2 | 3.64 | 0.13 | 9.0 | 4.3 | 5.8 | 0.77 |
| 3a (after heating) | 0.8 | 2.2 | 0.10 | 9.0 | 4.3 | 3.4 | 0.58 |

According to simple beam bending arguments [Gibson and Ashby, 1997] the effective elastic modulus ($E^*$), for a given material and honeycomb cell geometry, scales according to $$\frac{E^*}{E_A} \alpha \left(\frac{t}{d}\right)^3, \quad (2)$$

where $E_A$ (=70 GPa) is the modulus of the monolithic material (austenite), t is the ligament thickness, and d is the honeycomb cell size. However, the stress at the onset of transformation ($\sigma^*$) is expected to scale as $$\frac{\sigma^*}{\sigma_0} \alpha \left(\frac{t}{d}\right)^2, \quad (3)$$

where $\sigma_0$ (=400 MPa) is taken as a characteristic transformation stress. The scale factors for the modulus and transformation-onset stress roughly agree for the first three Examples, differing by about 25% and 10%, respectively. The values for Experiment 3a (after full thermal recovery) are lower, as expected, due to the thermomechanical history of the specimen.

As described, built-up honeycomb structures with about 5% relative density having been fabricated from conventional wrought Nitinol material. Long-standing difficulties with the joining of Nitinol to itself have been solved by using the above-described brazing technique. The structures, after post-braze heat treatment, have been shown to possess amplified transformational superelasticity when subject to severe in-plane compression. Superelastically-recoverable bending strain in the Nitinol ligaments spanning between brazed joints allowed isothermal recovery of compressive strains that were a factor of ten greater than can be extracted from monolithic Nitinol. The findings have broad potential significance for lightweight armor, general energy absorption materials, high-displacement actuators, smart/active structures, and for infusable, compliance-matched biomedical implants.

Fractography

FIG. 21 shows a fracture surface from a braze joint like the one shown in FIG. 12. The two tubes were pulled apart manually at room temperature. As is apparent in the micrograph, the fracture path ran through the braze metal which did not pull away from the adjacent NiTi tube surfaces. A high magnification detail from this fracture (right) surface shows a dimpled surface typical of fully ductile fracture.

Other metals, other than pure niobium, that should perform adequately as braze metals like that described above include vanadium, which lies directly below Nb on the periodic table. Pure nickel has also been found in our experiments to form a transient liquid phase that wets NiTi at temperatures above 1170° C. and should also function as a substitute for all or a portion of the Niobium.

The Brazing Process

The above-described brazing process is applicable to all alloys of nickel and titanium ('nitinol') particularly to the alloys that have previously been processed by rolling, drawing or extrusion to produce sheet, tube, strip, rod, wire, or other corrugated, rolled, wrapped, bent, perforated, or slotted forms. The process also is applicable to alloys based on NiTi such as NiTiHf, NiTiZr, NiTiPd, NiTiPt, NiTiAu, NiTiCu, NiTiNb, NiTiFe, NiTiAl or other ternary or quaternary compositions.

To achieve the full advantage of the above-described brazing process, Niobium is the brazing metal and, should be relatively pure (at least 90%, preferably at least 95%, more preferably at least 99%, most preferably at least 99.5% pure Niobium. Such relatively pure niobium brazing metals require no fluxes, while achieving strong bonds between adjacent nitinol elements. Preferably, the amount of braze metal should be limited to no more than is required to form a joint of adequate cross-sectional area to give the desired strength in the joint. The braze metal need not be placed directly in the region to be joined, but should be situated so that upon formation of the liquid phase, after initial nitinol contact, capillary forces will draw the liquid into the joint region where it is subsequently allowed to solidify. To achieve the full advantage of the brazing process described herein, processing is done in a vacuum, preferably at pressures not exceeding $10^{-5}$ Torr, and optimally at pressures not exceeding $5 \times 10^{-6}$ Torr. A variation on the process is to braze under one atmosphere pressure of high-purity (at least 99%) argon or other suitable inert gas, excluding nitrogen. The process temperature is ideally 1175° C. with variations allowing a process temperature between 1170 and 1275° C. After holding for times between a few seconds to thirty minutes at the brazing temperature, the brazed article is allowed to furnace cool, or alternately may be quenched to low temperature, or down-quenched to an intermediate temperature for the purpose of modifying the microstructure of the braze.

After brazing, the article is heat treated (or post braze annealed) at a lower temperature to restore superelastic or shape-memory properties to the article. The heat treatment temperature after brazing is preferably 325 to 550° C. for times between about 1 minute and about 3 hours, preferably about 90 minutes, followed by furnace cooling or quenching to room temperature. Variations include additional down-quenching or heat treatment to temperatures between 600 and 1000° C. for between 10 minutes and about 3 hours, preferably about 90 minutes, to solutionize the nitinol articles and optimize the properties of the braze joint, prior to lower temperature heat treatment to optimize the properties of the shape-memory or superelastic elements by precipitation of $Ni_4Ti_3$ precipitates.

Deployment of the Braze Metal

Since niobium aggressively reacts with NiTi to form a transient liquid phase, excess Nb at any location may damage the NiTi structure by excessively removing NiTi from critical structural locations. Therefore, the niobium braze material preferably is deployed in such a way that the transient liquid phase flows by capillarity immediately to the zones where it is needed, so that the braze joint process provides just enough material to form a robust joint, and no more. Experimental joints have been fabricated, without damage to the NiTi elements being adhered, by simply placing pure Nb wires in the general vicinity of the intended joint, in irregular contact with the NiTi tube walls. The high degree of wetting and facile flow of the transient liquid produced joints of remarkable strength and toughness.

In cases where any of the various coating process are used (PVD, CVD, laser ablation, and thermal/plasma/kinetic spray methods) a variation involves either masking of the NiTiX article prior to coating, and/or the selective removal of the coating in regions where the Nb braze material is not desired. Such removal may be accomplished by well-known photolithographic techniques of masking and etching to form patterned niobium coatings, or may involve abrasive removal by grit blasting, grinding, ion-etching, or other method of selective material removal.

In other embodiments of the invention, small amounts (less than 5 at %) of transition metals, such as V, Zr, Hf, or Ta, as required to control precipitation of unwanted or embrittling intermetallic phases, can be included in a microalloying procedure.

Figure 4:
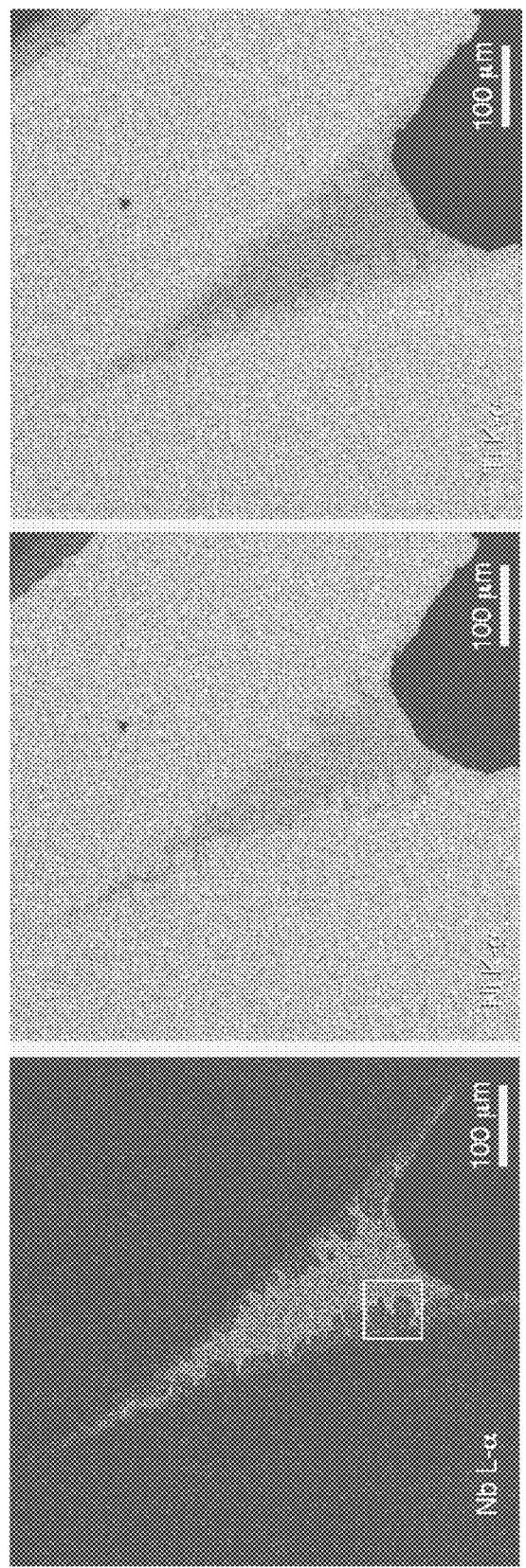
FIG. 4 shows: Left (FIG. 4A): Nb L-α X-ray fluorescence map. Center (FIG. 4B): Ni K-α X-ray fluorescence map, same field; Right (FIG. 4C): Ti K-α X-ray fluorescence map. All are from the same field shown in FIG. 3.

It is theorized, but not relied upon, that interdiffusion involves penetration of pure niobium by both Ni and Ti. In other words, the composition of both of the interdiffusion zones proceeds roughly along the quasibinary line on FIG. 4. It is likely, however, that Nb diffuses into the NiTi superlattice with a slight preference for Ti-substitutional sites, such that the diffusion zone on the TiNi side becomes relatively enriched in nickel, moving compositions closer to the NiTi single-phase field, below the line in FIG. 4. Conversely, the niobium-rich zone is expected to accept slightly more Ti than Ni, thereby moving the composition in the niobium-rich diffusion zone toward the Ti-corner, and away from the NiTi+ $\beta+\mu$ three-phase field.

Additional variations on this process employ microalloying with small amounts (<5 at %) transition metals such as V, Zr, Hf, or Ta, as required to control precipitation of unwanted or embrittling intermetallic phases.

The following are examples of methods of the present invention, and illustrate variations on the embodiment of placing Nb wires adjacent to the joint to be brazed.

Electroplating is one alternative method of positioning the brazing metal in a proper position to form a joint between NiTi structures. However, electroplating of pure niobium is difficult. Nevertheless, electroplating is possible by using alkali chloride melts at elevated temperature (e.g., 650° C. to 750° C.) (Gillesberg, et al., 1999).

Physical vapor deposition that coats NiTi bodies with niobium prior to assembly of the components to be brazed is another deployment method. Although niobium is difficult to electroplate, it is possible to deposit thin niobium films by physical vapor deposition processes. Such processes include vacuum evaporation and sputtering, both of which are economical and highly scalable. Typically, the volume of brazing metal used to form a robust joint is on the order of the length times twice square of the wall thickness of the components to be joined. For example, for joining ⅛" diameter thick-walled tubes, this volume would be achieved by a coating about 20 microns thick. Thinner coatings are used for thinner walled tubes. Methods related to vapor deposition include, but are not limited to, cathodic arc coating and laser ablation coating. Chemical vapor deposition (CVD) techniques also can be used to coat NiTi structures with pure niobium.

Plasma spray, thermal spray, electric arc spray and kinetic metallization processes are economical methods of applying thin layers of niobium to NiTi surfaces to be joined. In addition, powder processes, using niobium-containing "inks," can be used to selectively coat NiTi structures to be joined. The coatings can be patterned using silk-screening.

In another embodiment, coextruding extrudable NiTi sections with pure niobium can be achieved because of the softness and high ductility of Nb. Also, laser cladding, using laser energy to locally melt an inert-gas jet carrying a pure Nb powder, such that it bonds to a substrate, can be used to selectively apply niobium to form appropriate patterns on the NiTi structures to be joined.

Honeycombs and Built-Up Forms:
General:
1. Forms exploiting shape-memory
2. Forms exploiting superelasticity
Specific Forms:
1. Tube bundles
2. Multilayer corrugated sheets
3. Spaceframes
4. Bundles of helically-wrapped NiTi strip (similar to tube bundles)
5. Auxetic forms (negative Poisson ratio)
6. Shafts made from multiple tubes
7. Flexible couplings
8. Bellows
9. Honeycomb core materials expanded after joining
10. End-to-end joining of wires, strips and sheets
11. Lap joints
12. Butt joints
13. Joining dissimilar extruded shapes
14. Joining NiTi to other metals and ceramics
Applications:
1. Bone replacement materials with low density and elastic modulus matching bone
2. Airframe components
3. Energy absorbing structures
4. Self-healing structures
5. Medical devices
6. Lightweight energy dissipating armor
7. Body armor
8. Lightweight acoustic damping materials
9. Eyeglass frames
10. Cellphone antennas A few possible topological forms are illustrated schematically in FIG. 22.

Nb Braze Materials: Fabrics and Spot Welding:

A solution to the Nb braze metal distribution problem is also to supply Nb, or a NiTi/Nb balanced braze material, in the form of a fabric woven with TiNi and pure Nb wires, or Ti, Ni, TiNiX, TiNi and Nb wires, as fine as 0.001 or less in diameter, in meshes that may have any form admitted by modern metal-wire-textile technology. Several desirable features and variations on this concept are described below:

Wires are available and are a reasonably cheap form of the applicable materials.

Textile forms are easily manipulated and involve mature technology.

A mesh structure has inherently high contact length, providing for rapid interdiffusion and liquefaction. This effect is readily magnified by obtaining area-contact through simple hot- or cold-rolling of the mesh or fabric.

A mesh presents very high capillarity which is guaranteed to access the joint for rapid liquid flow to the desired location. This effect is can be augmented by pre-rolling the mesh to generate area-contacts, and flatter contacts at the surfaces of the articles to be joined. The fibers woven into the mesh can themselves be supplied as twisted multi-wire bundles.

This textile-inspired approach provides an ability to accurately and arbitrarily adjust Ti:Ni:Nb:X ratios by selection of wire diameter, number, and the element/compound mix. Concurrently, control the total braze mass is achieved by adjusting mesh pitch (sparseness of open weave) and overall thickness. Knitted and crocheted forms and sewn structures are also envisioned.

The fine, thin mesh topology can easily be adapted to the preparation of strips, spots, tapes, perforated sheet, or sheets both perforated and deformed out-of-plane. Perforation of meshes can be of arbitrary size, pattern and distribution. Preparation of three-dimensional forms containing nitinol wires is may in some cases require shape-setting anneals, preferably at 500 C for 1 minute to 10 hours, but at any temperature low enough to preclude premature reaction-melting of the braze components.

Fabrics can be engineered in which the mesh composition is not homogenous in the plane of the sheet, and where spatial variations in mesh density and composition are engineered through selection and spatial variation of wire type, size, and local spacing. Control of warp and woof wire-sequences allows creation of two-dimensional spatial patterns. Two-dimensional patterns can be made more sparse between "dense-mesh" loci, where dense-mesh regions are intended to span or lie adjacent to desired joint contact areas, and sparser interconnecting regions are intended for transient structural support and positioning of sheet or tape mesh forms. For example, homogenous wrought nitinol sheets, formed into an egg-crate topology, could be interleaved mesh having a patterned-sparsity that concentrates fibers between the surfaces of the egg-crate contacts. Or, in the joining of linearly corrugated nitinol sheets, the associated mesh could have very sparse warp (providing a required minimum of structural integrity in the direction perpendicular the corrugation line-contacts), and a patterned woof with wires concentrated near the article-article contact zones, but spaced more sparsely in between. (Patterned foils and multilayer foils could be used the same way with some loss of effective capillarity).

The mesh form presents an inherently high friction coefficient that promotes positional stability for application in strip or spot form or as sparse-connected meshes.

Meshes can be coated by PVD/CVD processes, plating, powder-infusion, or thermo-kinetic spray-coating, with any desired alloy component or additive.

Meshes are amenable to inexpensive chemical and/or physical pre-processing (i.e., washing, chemical or electrochemical etching, sputtering, grit blasting, or ultrasonic scrubbing), to remove surface-contaminants.

Meshes are reasonably stiff. The mesh can additionally be provided with small fraction of fine, temperature-stable reinforcement-fiber materials such as tungsten, boron nitride, graphite, alumina, or other similar refractory material, to control mesh collapse behavior during the liquifaction stage, in a way that minimizes braze-attack on out-of contact regions of the joined articles without too-seriously affecting the braze chemistry.

Further positional stability can be obtained by spot-welding of the mesh, at judiciously selected locations, to the articles to be joined.

Embodiments of composite wires of TiNi and Nb include, but are not limited to, the following:

(a) twisted wires wherein multiple wraps to maximize the contact area, including a "shielding"-type wrap of very fine wire for 100% Nb-coverage of a TiNi wire, are achieved. The relative composition is related to wire gauges, the number of wires, and pitch. Niobium can be helically wrapped around a TiNi core, or NiTi/Nb twisted pairs, or higher multiples. Because of different densities (i.e., NiTi 6.45 and Nb 8.55 g/cm$^3$), about one-half of the cross section area is niobium. See FIG. 11A. The composite can be twisted sufficiently tight such that Nb wire plastically deforms, thus increasing contact area;

(b) Coextrusion to provide an Nb-clad TiNi wire, e.g., a TiNi rod inserted into a Nb tube, or vice-versa, also can be utilized. The composite then is rolled or extruded at a temperature below 850° C. to obtain desired final dimensions and geometry;

(c) A eutectic TiNiNb alloy brazing metal; as a wire or sheet, can be prepared from a melt-solidified eutectic TiNiNb alloy; and (d) Powder metallurgy variation is envisioned, wherein fine ($10^{-30}$ micron) TiNi and Nb powders are mixed in ratios as described above, and delivered to a bonding zone with a binder, or by gravity, or by mechanical capture using engineered shape at bulk TiNi contacts as illustrated in FIG. 11b. Powder processes (such as ball-milling and cryo-milling) can be used to produce mechanical alloys. These mechanical alloys then can be hot pressed at about 850° C. and rolled or extruded to provide final forms, such as sheets, pads, strips, and wires, for brazing alloy inserts.

Another embodiment is patterned thick-film deposition, as described below:

(a) In one variation for fabricating honeycombs from sputtered thin film TiNi, a pattern is deposited via masks onto niobium on free-standing sputtered NiTiX films wherein X is Hf or Zr substituted for Ti and/or X is Cu, Pd, Pt and/or Au substituted for Ni, e.g., NiTiCu or Ti(Ni+Pd) with thicknesses of about 10 to about 100 microns. In the preferred form of NiTiX, wherein Hf and/or Zr is substituted for a portion of the Ti, the number of moles of Ni is approximately equal to the number of moles of Ti+X. Similarly, in the preferred form, when Cu, Pd, Pt and/or Au is substituted for a portion of the Ni, the total number of moles of Ti is approximately equal to the total number of moles of Ni+X. For example: Ti(Ni+Pd) might refer to an alloy of 50 at %-Ti+about 30 at % Pd+about 20 at % Ni. Note the Ti:[Pd+Ni] approximately 50:50 stoichiometric ratio. It also is possible to deposit TiNi/Nb multilayers, with layer dimensions of about 5 to about 50 nanometer range, having relative Nb:NiTi ratios as discussed above.

The corrugated sheet shape is set by heating in a die at 500° C. The bond is illustrated in FIG. 23, in an arbitrary number of layers.

(b) In a variation for fabricating honeycomb core materials, corrugated strips are cut from above, made as honeycomb core, and brazed to face sheets. Face-sheet/honeycomb compliance is optimized to match to application requirements. The inside of the face sheet can be Nb— or Nb—TiNi multilayer coated. The TiNiNb melt is drawn to the bond line by capillarity.

(c) In selective mechanical removal, either an Nb thick film or Nb/NiTi multilayers are deposited onto a wrought tube or wrought corrugated sheet forms. The original coating is uniform (i.e., is nonpatterned). Next, a tube-bundle or corrugated lay-up is assembled, and secured with fixturing. Then either an erosive fluid or gas entraining an abrasive suspension is passed through passages to mechanically remove excess Nb from areas where Nb is not desired (e.g., far from capillary zones). Alternatively, electrolytic erosion of accessible anodic Nb coating flowing electrolyte can be used. In cases wherein one of the above coating process are used (e.g., PVD, CVD, laser ablation, and thermal/plasma/kinetic spray methods), a variation involves either masking of the NiTi structure prior to coating, and/or the selective removal of the coating in regions where the Nb brazing metal is not desired. Such metal removal can be accomplished by well-known photolithographic techniques of masking and etching to form patterned niobium coatings, or can involve abrasive removal by grit blasting, grinding, ion etching, or other methods of selective metal removal.

In accordance with the methods described herein, the method can be used to provide joined forms exhibiting shape memory, joined forms exhibiting superelasticity, or both. Specifically, the present method can be utilized to manufacture tube bundles, multilayer corrugated sheets, spaceframes, bundles of helically wrapped NiTi strip (similar to tube bundles), auxetic forms (negative Poisson ratio), shafts manufactured from multiple tubes, flexible couplings, bellows, honeycomb core materials expanded after joining, end-to-end joining of wires, strips and sheets, lap joints, butt joints, joining dissimilar extruded shapes, and joining NiTi to other metals and ceramics. In particular, the joining technique is applicable to the fabrication of discrete components made from nitinol alloys, such as eyeglass frames, surgical tools, safety devices, toys, actuators, and the like.

The architectures discussed previously are simple examples of a wide variety of possible built-up topologies (see FIG. 22), enabled by the bonding method, that can be engineered for customizable net section properties, arbitrary shape, and kinematically-enhanced thermomechanical shape-memory and superelastic response. The simplicity and robustness of the joining method, which is inexpensive and clean, will be applicable to forms of nearly arbitrary complexity over a broad range of length scales and potential novel applications. Other 2-D honeycombs can be made with close-packed, thin-walled cylindrical tubes (similar to those in Papka and Kyriakides, 1998, hereby incorporated by reference, which were made of polycarbonate). Also, 3-dimensional lattice structures can be made in the form of panels, beams, and space frames. It will be advantageous to make built-up structures from wires, since this is the most inexpensive form of wrought Nitinol available. Geometric design will maintain sufficient slenderness in cellular structural elements so that local strains stay within the transformational limits of Nitinol (2 to 8% strain, depending on required high-cycle fatigue performance), even when macroscopic deformations exceed 30 to 80%. Preferred will be on structural designs that have 5% relative density, or less, in order to reduce weight and to improve the surface area to volume ratio.

These honeycomb or other cellular structures would provide superior lightweight aerospace structures using new shape memory alloy (SMA) cellular materials. This material concept combines the advantages of cellular solids (high strength/mass, large energy absorption capability/mass) with the excellent structural properties and adaptive capabilities of NiTi-based SMAs (superelasticity and shape memory capability). The internally-sparse panel structures are useful in an isothermal superelastic mode for damage resilient structures, with an eye towards impact mitigation. The strain recovery capability would be especially useful in shape-critical components under transient overload conditions. Such SMA-based structures could also be designed to be used in a thermally active mode for mechanical actuation/latching and deployment devices. The sparseness of the material elements and the large surface-area/material-volume ratio provide both strain amplification and improved response time compared to monolithic SMAs. Accordingly, the objectives of the project are to these materials should have (1) have over 50% recoverable strain and (2) have a 10-fold decrease in thermal response time compared to their monolithic counterparts. These cellular structures are useful to manufacture sandwich beams and panels with inner layers of SMA cellular material.

SMA honeycombs are also useful in defense and aerospace applications as thermally active multifunctional materials, highly resilient structures, lightweight armor, and in novel vibration damping systems. The brazing method itself should be adaptable the joining of even heavy structural sections, if desired. In addition, the above-described brazing technique should be useful to join Nitinol to certain dissimilar metals such as titanium and stainless steel.

SMA and superelastic honeycombs and similar sparse topologies are also useful in biomedical applications. Three-dimensionally open topologies such as shown in FIG. 22k, which are readily infusible by tissues, can be used advantageously as bone-replacement materials in which the structural cross section may be arbitrarily adjusted so that the net section compliance matches that of human bone. Alternatively, such structures may be constructed in part or wholly of NiTi alloy designed for shape-memory expansion upon insertion into the body in order to create a strong mechanical connection to prepared cavities in bones. Initially deformed at low temperature (in the martensitic state), once the shape recovery process has positioned and secured the NiTi article, the latter can function superelastically at body temperature. In this case, the alloy preferably has an austenite finish temperature below body temperature.

The above-described methods and structures are also useful for a number of aircraft applications, such as wings, rotors, engine inlets, compressor blades, where large shape changes are desired to adapt to varying flight and environmental conditions. The use of monolithic NiTi has been problematic for these applications in the past due to limited displacements associated with allowable strain limits and the slow response rate due to "thermal inertia". Both characteristics should be improved dramatically through the use of sparse, open-cell structures. For example, it should now be possible to meet the bandwidth requirements of airfoil control surfaces, which have been exceedingly difficult to meet with monolithic NiTi. As an actuator, the above-described materials can be used as a replacement for pneumatic elastomeric "boots" on the leading edges of fixed wing aircraft and rotorcraft for deicing purposes. (Currently, an erosion concern exists for elastomeric boots on rotor blades. No such concern should exist for NiTi which is quite wear resistant) The low effective density of these structures is also useful for weight sensitive and shape sensitive aerospace applications. The multifunctional nature of the material could be useful for thermal protection systems. The large effective recoverable strain could be useful in deployment devices for spacecraft applications. The large specific energy absorption capabilities could be useful to mitigate vibration and impact in both aircraft and spacecraft.

The potential benefits of this new low-density material concept to the Air Force's future research and development efforts are considerable. Both the enhanced superelastic and the thermally adaptive capabilities of cellular SMAs may enable numerous aircraft and spacecraft applications. These include reusable energy absorbers for critical missile and spacecraft components during launch, mating devices, low volume to high volume deployment devices, and multifunctional structural skins with adaptive density, thermal conductivity, and acoustical impedance. All of these applications would benefit from the high strength/mass, high resilience/mass, and high actuation work/mass of cellular Nitinol-based structures.

REFERENCES

Ashby, M. F., Evans, A., Fleck, N. A., Gibson, L. J., Hutchinson, J. W. Wadley, H. N. G., *Metal foams: a design guide*, Butterworth-Heinemann, 2000.

Dong, Z., Jia, D., Tang, Z., Liu, W., & Wang, D. (2000). Effect of alloying elements zr, cr, V on corrosion behavior of ti-ni-nb shape memory alloy. *Materials Science Forum*, 327-328, 147-149. Retrieved Sep. 10, 2004, from CSA Materials Research Database with METADEX database.

Dong, Z., Liu, W., Jia, D., Tang, Z., & Wang, D. (2000). Corrosion resistance of the ni-ti-nb based shape memory alloys. *Xiyou Jinshu Cailiao yu Gongcheng (Rare Metal Materials and Engineering)*, 29(3), 182-184. Retrieved Sep. 10, 2004, from CSA Materials Research Database with METADEX database.

Eisenbarth E, Velten D, Muller M, Thull R, Breme J, "Biocompatibility of beta-stabilizing elements of titanium alloys", Biomaterials 25 (26), pp. 5705-5713, 2004.

Gibson, L. G., Ashby, M. F., Cellular Solids: Structure and Properties, 2nd ed., Cambridge University Press, 1997.

Gillesberg, B., et al., "Niobium plating processes in alkali chloride melts", Journal of Applied Electrochemistry 29 (8): 939-949, August 1999.

Grummon, D. S., Shaw, J. A., Gremillet, A., "Low-Density Open-cell Foams in the NiTi System", Applied Physics Letters, Vol. 82, No. 16, 21 Apr. 2003.

Gupta, K. P. in Phase Diagrams of Ternary Nickel Alloys, Part 2, Section D.2, "The Nb—Ni—Ti (Niobium-Nickel-Titanium) System, pp 163-176, Indian Institute of Metals, Calcutta (1991).

Iadicola, M. A., Shaw, J. A., "Rate and Thermal Sensitivities of Unstable Transformation Behavior in a Shape Memory Alloy", International Journal of Plasticity, Vol. 20, pp. 577-605, 2004.

Jia, D., Han, M., Liu, W. X., Wang, D. -. -., & Dong, Z. -. -. (2000). Thermodynamics of martensite transformation hysteresis in ni-ti shape memory alloys. *Transactions of the Nonferrous Metals Society of China*, 10(3), 411-413. Retrieved Sep. 10, 2004, from CSA Materials Research Database with METADEX database.

Jia, D., Liu, W., Han, M., Wang, D., & Dong, Z. (2000). Some properties of ni-ti-nb-X quaternary alloys. *Zeitschrift fur Metallkunde*, 91(3), 258-260. Retrieved Sep. 10, 2004, from CSA Materials Research Database with METADEX database.

Lagoudas, D., Entchev, P., Vandygriff, E., Qidwai, M., DeGiorgi, V., "Modeling of thermomechanical response of porous shape memory alloys", Proceedings of the Adaptive Structures and Material Systems Symposium, ASME International Mechanical Engineering Congress and Exposition, 2001.

Li, B., Rong, L., Li, Y., Gjunter, V. E., "Synthesis of porous Ni—Ti SMA by SHS: Reaction mechanism and anisotropy in pore structure," Acta Materialia, 48(15), pp. 3895-3904, 2000.

Melton, K. N., Proft, J. L., Duerig, T. W., "Wide hysteresis shape memory alloys based on the Ni—Ti—Nb system", Proc. MRS International Meeting on Advanced Materials. Vol. 9, Shape Memory Materials; Tokyo; Japan; 31 May-3 Jun. 1988, pp. 165-170, 1989.

Melton, K. N., Proft, J. L., & Duerig, T. W. (1989). Wide hysteresis shape memory alloys based on the ni-ti-nb system. *Proceedings of the MRS International Meeting on Advanced Materials. Vol. 9. Shape Memory Materials; Tokyo; Japan;* 31May-3 Jun. 1988, 165-170. Retrieved Sep. 10, 2004, from CSA Materials Research Database with METADEX database.

Papka, S. D., Kyriakides, S., "Experiments and full-scale numerical simulations of in-plane crushing of a honeycomb", Acta Materialia, Vol. 46, No. 8, pp. 2765-2776, 1998.

Papka, S. D., Kyriakides, S., "In-plane compressive response and crushing of honeycomb", J. Mech. Phys. Solids, Vol. 42, pp. 1499-1532, 1994.

Prema, S. B., Tret'yachenko, L. A., Petyukk, V. M, "Investigation Methods and Properties of Powdered Materials: Phase Relations in the Ti—TiNi—NbNi—Nb Region of the Ternary System Ti—Nb—Ni", Powder Metallurgy and Metal Ceramics 34, p 155, 1995.

Shaw, J. A., Kyriakides, S., "Thermomechanical Aspects of NiTi", Journal of the Mechanics and Physics of Solids, Vol. 43, No. 8, pp. 1243-1281, 1995.

Shaw, J. A., Kyriakides, S., "On the Nucleation and Propagation of Phase Transformation Fronts in a NiTi Alloy", Acta Materialia, Vol. 45, No. 2, pp. 683-700, 1997.

Shaw, J. A., Gremillet, A., Grummon, D. S., "The Manufacture of NiTi Foams", ASME Adaptive Structures & Materials Systems Symposium, ASME winter meeting, New Orleans, La., November 2002.

Shaw, J. A., Chang, B.-C., Iadicola, M. A., Leroy, Y. M., "Thermodynamics of a 1-D Shape Memory Alloy: Modeling, Experiments, and Application", Proceedings of the SPIE 10th Annual International Symposium on Smart Structures and Materials, San Diego, Calif., 2-6 Mar. 2003.

Siegert, W., Neuking, K., Mertmann, M., & Eggeler, G. (2002). Influence of nb content and processing conditions on microstructure and functional properties of NiTiNb shape-memory alloys. *Materials Science Forum*, 394-395, 361-364. Retrieved Sep. 10, 2004, from CSA Materials Research Database with METADEX database.

Simpson, J. A., Melton, K., & Duerig, T. (1988). Nickel/Titanium/Niobium shape memory alloy and article. *Official Gazette of the United States Patent and Trademark Office. Trademarks*, (U.S. Pat. No. 4,770,725) Retrieved Sep. 10, 2004, from CSA Materials Research Database with METADEX database.

Thangaraj, K., Chen, Y. C., & Salama, K., "Fabrication of porous NiTi shape memory alloy by elemental powder sintering", Proceedings of the Adaptive Structures and Material Systems Symposium, ASME International Mechanical Engineering Congress and Exposition, 60 (November), pp. 59-63, 2000.

Yang, H., Ying, W., Yang, Z., Lin, J., Zhang, X., & Guo, J. (2002). Product microstructure of ti-ni-nb shape memory alloy (SMA) by high-temperature synthesis (SHS) of self-propagating. *Xiyou Jinshu Cailiao yu Gongcheng (Rare Metal Materials and Engineering)*, 31(2), 152-155. Retrieved Sep. 10, 2004, from CSA Materials Research Database with METADEX database.

Yufeng, Z., Rongdi, H., Wei, C., Liancheng, Z., & Tinghua, Z. (1996). The machining of ni-ti-nb shape memory alloy with wide hysteresis. *Chinese Journal of Nonferrous Metals*, 6(2), 113-116, 120. Retrieved Sep. 10, 2004, from CSA Materials Research Database with METADEX database.

Zhang, C. S., Wang, Y. Q., Chai, W., & Zhao, L. C. (1991). The study of constitutional phases in a ni sub 47 ti sub 44 nb sub 9 shape memory alloy. *Materials Chemistry and Physics*, 28(1), 43-50. Retrieved Sep. 10, 2004, from CSA Materials Research Database with METADEX database.

Zhang, C. S., Zhao, L. C., Duerig, T. W., & Wayman, C. M. (1990). Effects of deformation on the transformation hysteresis and shape memory effect in a ni sub 47 ti sub 44 nb sub 9 alloy. *Scripta Metallurgica et Materialia*, 24(9), 1807-1812. Retrieved Sep. 10, 2004, from CSA Materials Research Database with METADEX database.

Zhao, L. C., Duerig, T. W., & Wayman, C. M. (1989). Transformation and mechanical behavior of a ni sub 47 ti sub 44 nb sub 9 shape memory alloy. *Proceedings of the MRS International Meeting on Advanced Materials. Vol. 9. Shape Memory Materials; Tokyo; Japan;* 31 May-3 Jun. 1988, 171-176. Retrieved Sep. 10, 2004, from CSA Materials Research Database with METADEX database.

Zhao, L., & Cai, W. (1997). Deformation-induced martensitic transformation and its reversibility in ni-ti-nb wide hysteresis shape memory alloys. *Acta Metallurgica Sinica (China)*, 33(1), 90-98. Retrieved Sep. 10, 2004, from CSA Materials Research Database with METADEX database.

Zhao, L., Zhang, C., & Cai, W. (1994). The study of the deformed stress-induced martensite and its stability in a ni-ti-nb alloy. *Shape memory materials '94; NI, nickel base alloys; shape memory materials '94; beijing; china;* 25-28 Sep. 1994, Beijing; China, 225-228. Retrieved Sep. 10, 2004, from CSA Materials Research Database with METADEX database.

Zhao, L. C. (2000). Study of ti-ni-nb shape memory alloys with a wide hysteresis. *Materials Science Forum*, 327-328, 23-30. Retrieved Sep. 10, 2004, from CSA Materials Research Database with METADEX database.

Zhao, L. C., & Cai, W. (1998). The interface structure and stability of deformation-induced martensite in a ni-ti-nb alloy with wide hysteresis. *International conference on displacive phase transformations and their applications in materials engineering; international conference on displacive phase transformations and their applications in materials engineering; urbana, illinois; USA;* 8-9 May 1996, Urbana, Ill.; USA, 93-100. Retrieved Sep. 10, 2004, from CSA Materials Research Database with METADEX database.

Zheng, Y., Cai, W., Luo, Y., & Zhao, L. (1997). Effects of heat treatment on tensile properties and shape memory effects of ni-ti-nb alloy. *Transactions of the Nonferrous Metals Society of China*, 7(4), 92-96. Retrieved Sep. 10, 2004, from CSA Materials Research Database with METADEX database.

The invention claimed is:

1. A cellular structure having improved shape memory compression and improved elasticity comprising:
   a nickel and titanium containing shape memory alloy (SMA) form comprising a plurality of SMA surfaces;
   a first SMA surface arranged adjacent to a second SMA surface; and
   a solidified eutectic liquid joint containing nickel, titanium, and niobium, having about equiatomic amounts of Ni and Ti, joining adjacent SMA surfaces.

2. The cellular structure of claim 1 further comprising a plurality of SMA forms joined by a plurality of joints.

3. The cellular structure of claim 1, wherein the joint was formed by a method comprising:
   positioning a reactive metal adjacent to the adjacent SMA surfaces;
   heating the adjacent SMA surfaces and the reactive metal to a reaction temperature insufficient to melt either the SMA form or the reactive metal but sufficient to form a eutectic liquid; and then
   cooling the SMA form and the eutectic liquid sufficiently to solidify the eutectic liquid before 10% by weight of the reactive metal is diffused into the SMA form.

4. The cellular structure of claim 3, wherein the reactive metal comprises niobium.

5. The cellular structure of claim 1, wherein each SMA form is a NiTi alloy.

6. The cellular structure of claim 1, wherein the adjacent SMA surfaces are arranged as a honeycomb or tube bundle.

7. The cellular structure of claim 1, wherein the adjacent SMA surfaces are arranged as a mesh.

8. The cellular structure of claim 1 further comprising an uncompressed density of less than 10%, measured as a surface to volume ratio.

9. The cellular structure of claim 8 further comprising an uncompressed density of less than 5%, measured as a surface to volume ratio.

10. The cellular structure of claim 1 further comprising a strain recovery greater than 50%.

11. The cellular structure of claim 1, wherein the structure has a regular cell structure.

12. An article comprising:
    a nickel and titanium containing shape memory alloy form having a first surface;
    a material having a second surface adjacent to the first surface; and
    a solidified eutectic liquid that comprises nickel, titanium, and niobium, having approximately equiatomic stoichiometic amounts of nickel and titanium, joining the first surface to the second surface.

13. The article of claim 12, wherein the solidified eutectic liquid was formed by a method comprising:
    positioning a reactive metal adjacent to the first and the second surfaces;
    heating the surfaces and the reactive metal to a reaction temperature insufficient to melt the SMA form, the material, or the reactive metal but sufficient to form the eutectic liquid; and then
    cooling the SMA form, the material, and the eutectic liquid sufficiently to solidify the eutectic liquid before 10% by weight of the reactive metal is diffused into the SMA form.

14. The article of claim 13, wherein the reactive metal comprises niobium.

15. The article of claim 12, wherein the solidified eutectic liquid is a quasibinary (NiTi)—Nb eutectic solid that contains two phases, an ordered metallic structure of NiTi and a disordered body-centered cubic solid solution of Nb, Ti, and Ni.

16. The article of claim 12, wherein the SMA form is a NiTi alloy.

17. The article of claim 12, wherein the material having the second surface is selected from the group consisting of NiTi alloy, metals, and ceramics.

18. The article of claim 17, wherein the material having the second surface is a metal other than a NiTi alloy.

19. The article of claim 17, wherein the material is a ceramic.

20. The article of claim 12, wherein the first surface and the second surface individually comprise metal oxides.

21. An article comprising:
a joint comprising a niobium containing solidified eutectic liquid fixing a first shape memory alloy form and a second shape memory alloy form relative to each other, wherein the solidified eutectic liquid is a quasibinary (NiTi)—Nb eutectic solid that contains two phases, an ordered metallic structure of NiTi and a disordered body-centered cubic solid solution of Nb, Ti, and Ni, having approximately equiatomic stoichiometic amounts of nickel and titanium.

22. The article of claim 21, wherein the first form is separate from the second form.

23. The article of claim 21 further comprising a plurality of joints fixing a plurality of forms relative to each other.

24. The article of claim 21, wherein the forms provide an article architecture selected from the group consisting of tube bundles; multilayer corrugated sheets; spaceframes; bundles of helically wrapped NiTi strip; auxetic forms; shafts manufactured from multiple tubes; flexible couplings; bellows; honeycombs; joined wire, strips and sheets; lap joints; butt joints; and mixtures thereof.

25. The article of claim 21, wherein the article is selected from the group consisting of a bone replacement material; an airframe component; an energy absorbing structure; a medical device; armor; an acoustic damping material; eyeglass frames; a cell phone antenna; a surgical tool; a safety device; a toy; and an actuator.

26. The article of claim 21, wherein the solidified eutectic liquid is solidified before 10% of the Niobium therefrom is diffused into the shape memory alloy form.

\* \* \* \* \*